US012214971B2

(12) United States Patent
Douglas et al.

(10) Patent No.: US 12,214,971 B2
(45) Date of Patent: Feb. 4, 2025

(54) CONTROLLABLE ARRAY SORTING DEVICE

(71) Applicant: AMP Robotics Corporation, Louisville, CO (US)

(72) Inventors: Cameron D. Douglas, Boulder, CO (US); Geoffrey N. Chiou, Broomfield, CO (US); Matanya B. Horowitz, Golden, CO (US); Mark Baybutt, Superior, CO (US); Travis W. Martin, Louisville, CO (US); Kevin M. Ehlmann, Lafayette, CO (US); Jason M. Calaiaro, Denver, CO (US); Robert M. Espinosa, Conifer, CO (US); Paul Dawes, Woodside, CA (US)

(73) Assignee: AMP Robotics Corporation, Louisville, CO (US)

( * ) Notice: Subject to any disclaimer, the term of this patent is extended or adjusted under 35 U.S.C. 154(b) by 691 days.

(21) Appl. No.: 17/409,630

(22) Filed: Aug. 23, 2021

(65) Prior Publication Data

US 2022/0106129 A1 Apr. 7, 2022

Related U.S. Application Data

(60) Provisional application No. 63/087,054, filed on Oct. 2, 2020.

(51) Int. Cl.

| | |
|---|---|
| ***B07C 5/342*** | (2006.01) |
| ***B07C 5/36*** | (2006.01) |
| ***B65G 43/00*** | (2006.01) |
| ***B65G 47/28*** | (2006.01) |

(52) U.S. Cl.

CPC .............. *B65G 47/28* (2013.01); *B07C 5/342* (2013.01); *B07C 5/368* (2013.01); *B65G 43/00* (2013.01)

(58) Field of Classification Search

CPC ........ B65G 47/00; B65G 47/34; B65G 47/74; B65G 47/46; B65G 47/28; B65G 43/00; G06V 20/647; G06V 10/70; G06V 10/82; G06V 10/58

See application file for complete search history.

(56) References Cited

U.S. PATENT DOCUMENTS

| | | | | |
|---|---|---|---|---|
| 4,081,362 A * | 3/1978 | Chamberlin | B07C 5/362 209/580 |
| 4,308,959 A | 1/1982 | Hoover | |
| 6,227,377 B1 * | 5/2001 | Bonnet | B65G 21/12 209/941 |
| 6,726,025 B1 | 4/2004 | Huskey | |

(Continued)

FOREIGN PATENT DOCUMENTS

WO 2017089992 6/2017

*Primary Examiner* — Jacob S. Scott

*Assistant Examiner* — Laurence R Brothers

(74) *Attorney, Agent, or Firm* — Van Pelt, Yi & James LLP

(57) ABSTRACT

A controllable array sorting device is disclosed, including: an array of diverting mechanisms; and a processor coupled to the array of diverting mechanisms, wherein the processor is configured to: process an instruction to perform a sorting action on a target item, wherein the instruction specifies a selected at least subset of the array of diverting mechanisms to use to perform the sorting action; and in response to the instruction, cause the selected at least subset of the array of diverting mechanisms to perform the sorting action on the target item.

20 Claims, 17 Drawing Sheets

100
106
102
104
105

600
602 Obtain Sensed Data Associated with a Set of Items On a Conveyor Device
604 Determine a Target Item to be Targeted by a Controllable Array Sorting Device Based at Least in Part on the Sensed Data, Wherein the Controllable Array Sorting Device Comprises an Array of Diverting Mechanisms
606 Select at Least a Subset of the Array of Diverting Mechanisms Based at Least in Part on an Attribute of the Target Item
608 Send an Instruction to the Controllable Array Sorting Device to Cause the Controllable Array Sorting Device to Use the Selected at Least Subset of the Array of Diverting Mechanisms to Perform a Sorting Action on the Target Item

(56) References Cited

U.S. PATENT DOCUMENTS

| | | | | |
|---|---|---|---|---|
| 8,615,123 | B2 | 12/2013 | Dabic | |
| 10,207,296 | B2 | 2/2019 | Garcia | |
| 10,350,644 | B1 | 7/2019 | Doak | |
| 10,625,304 | B2 | 4/2020 | Kumar | |
| 10,710,119 | B2 | 7/2020 | Kumar | |
| 10,722,922 | B2 | 7/2020 | Kumar | |
| 2009/0065330 | A1 | 3/2009 | Lupton | |
| 2010/0236994 | A1* | 9/2010 | Hoffman | B07C 5/362 209/552 |
| 2017/0232479 | A1 | 8/2017 | Pietzka | |
| 2018/0071786 | A1 | 3/2018 | Robbins | |
| 2019/0030571 | A1* | 1/2019 | Horowitz | B07C 5/367 |
| 2020/0290088 | A1 | 9/2020 | Kumar | |
| 2020/0368786 | A1 | 11/2020 | Kumar | |
| 2021/0035313 | A1* | 2/2021 | Ghadyali | G06T 7/246 |
| 2021/0229133 | A1 | 7/2021 | Kumar | |
| 2021/0346916 | A1 | 11/2021 | Kumar | |
| 2022/0016675 | A1 | 1/2022 | Kumar | |
| 2022/0023918 | A1 | 1/2022 | Kumar | |

* cited by examiner

500
Sorting Control Device
502
Neural Processing Logic
504
Sorting Logic
Control Signal
Sensed Data 100
Controllable Array Sorting Device
550
Local Controller
552
Mechanism(s)
Control Signal

CONTROLLABLE ARRAY SORTING DEVICE

CROSS REFERENCE TO OTHER APPLICATIONS

This application claims priority to U.S. Provisional Patent Application No. 63/087,054 entitled CONTROLLABLE AIR JET SORTING DEVICE filed Oct. 2, 2020 which is incorporated herein by reference for all purposes.

BACKGROUND OF THE INVENTION

One type of conventional sorting device relies on hyperspectral signals that are received from examined items. Upon receipt of a hyperspectral signal from an item, the conventional sorting device will determine whether to act on sorting the item or determine not to based on the hyperspectral signal. However, the conventional sorting device's act of sorting an item is not dynamically tailored to that particular item.

BRIEF DESCRIPTION OF THE DRAWINGS

Various embodiments of the invention are disclosed in the following detailed description and the accompanying drawings.

DETAILED DESCRIPTION

Figure 1:
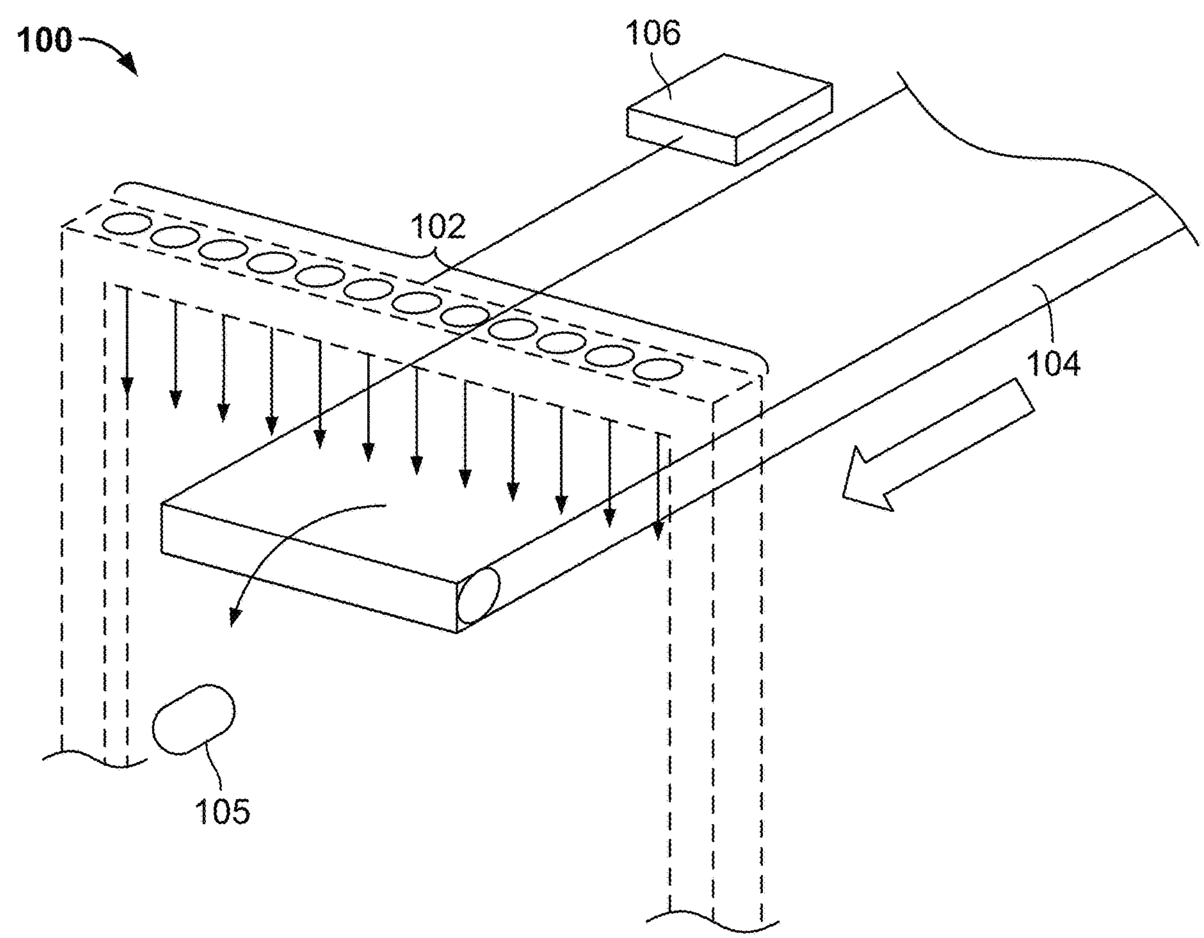
FIG. 1 shows an embodiment of a controllable array sorting device.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of a controllable array sorting device are described herein. Sensed data associated with a set of items on a conveyor device is obtained. For example, the sensed data may comprise one or more images of the set of items. A target item that is to be targeted by a controllable array sorting device is determined based at least in part on the sensed data. The controllable array sorting device comprises an array of diverting mechanisms. In some embodiments, the array of diverting mechanisms may comprise one or more air orifices from which respective pressurized airflows can be emitted. In some embodiments, the array of diverting mechanisms may comprise one or more mechanical paddles that can be actuated to move. At least a subset of the array of diverting mechanisms is selected based at least in part on an attribute of the target item. An instruction (e.g., control signal) is sent to or generated within the controllable array sorting device to cause the controllable array sorting device to use the selected at least subset of the array of diverting mechanisms to perform a sorting action on the target item (e.g., while the target item is on the conveyor device or after the target item falls off the conveyor device). In response to receiving the instruction (e.g., from the sorting control device, a local processor, or a cloud server), the controllable array sorting device is configured to perform the sorting action on the target item using the selected at least subset of the array of diverting mechanisms. Examples of items on which to perform a sorting action by a controllable array sorting device as described in various embodiments described herein include but are not limited to recycling, garbage, e-waste, demolition waste, packages, luggage, manufacturing assembly lines, and produce. Specifically, the sorting techniques introduced here are applicable to any sorting process where one or more objects must be identified and then manipulated in the context of a sorting line. In an embodiment related to shipping or storing packages, as a package moves along a conveyor, a visual or non-visual sensor provides sensed data that a processor utilizes to recognize that the object needs to be manipulated. Such recognition can be based upon a physical attribute of the object, including but not limited to shape, color, non-visible spectral analysis, identifying tags, or labels. Once a package is recognized in this embodiment, the processor generates an instruction that triggers a diverting mechanism to move the package out of the sorting line. Embodiments of a diverting mechanism to manipulate the package include one or more of robotic grapples, robotic pusher or suction devices, gate or door mechanisms, magnetic couplers, or air jets.

In various embodiments, the controllable array sorting device is located at the end of the conveyor device from which items being transported by the conveyor device fall off from the conveyor device. As the items fall off the conveyor device and before they land on another surface (e.g., another conveyor device), the controllable array sorting device may be instructed to use the selected subset of its diverting mechanisms to perform a sorting action on the target items to remove the target items from the stream of items. In some embodiments, the controllable array sorting device is located over or to the side of the conveyor device that is transporting items. As the items are being transported along the conveyor device, the controllable array sorting device may be instructed to use the selected subset of its diverting mechanisms to perform a sorting action on the target items to remove the target items from the stream of items being transported along the conveyor device. In various embodiments, performing a sorting action on a target item includes removing the target item from a stream of materials by deflecting the target item into a collection container or onto a target conveyor using at least a subset of the diverting mechanisms of the controllable array sorting device. In various embodiments, "target" items can be either materials that are desired to be recovered (e.g., recyclable materials) or materials that are not desired to be recovered (e.g., contaminant items), depending on the application of the sorting device. As will be described in further detail below, the at least subset of the diverting mechanisms of the controllable array sorting device is dynamically selected such that target items on which sorting actions are to be performed can be successfully deflected into collection containers and with a reduced likelihood that a nearby non-target item will also be inadvertently deflected into the collection containers.

FIG. 1 shows an embodiment of a controllable array sorting device. FIG. 1 shows a controllable array sorting device, controllable array sorting device 100. In various embodiments, a "controllable array sorting device" comprises a device that includes a structure that supports one or more arrays of diverting mechanisms that can be activated to deflect a target item into a collection container. In the example of FIG. 1, controllable array sorting device 100 comprises diverting mechanism array 102 (and a local controller/processor that activates diverting mechanism array 102, which is not shown in FIG. 1). In the example of FIG. 1, diverting mechanism array 102 includes 12 diverting mechanisms, where each is represented by a black dot. While controllable array sorting device 100 includes one array of 12 diverting mechanisms, in actual practice, a controllable array sorting device may include any number of diverting mechanisms in any number of arrays. In some embodiments, at least some of the diverting mechanisms are air orifices that are connected to one or more pressurized air source(s) (not shown in FIG. 1). The air orifices are controlled by a local controller/processor, which is configured to cause pressurized air to be emitted from the air orifices. For example, an "air orifice" comprises an air opening or an air knife (e.g., a series of small air openings). In some embodiments, at least some of the diverting mechanisms are paddles that are connected to a local controller/processor (not shown in FIG. 1), which is configured to activate the paddles by causing the paddles to swing out and then retract. Other embodiments of a diverting mechanism to manipulate a target item include one or more of robotic grapples, robotic pusher or suction devices, gate or door mechanisms, rotating friction wheels, magnetic couplers, or air jets. As shown in FIG. 1, controllable array sorting device 100 is configured to be placed near an end of conveyor device 104 and is configured to deflect target items (e.g., such as item 105) that fall off that end of conveyor device 104 (e.g., by shooting air or by making physical contact). The fired-on target items are deposited into and/or transported into a collection container for storing recovered materials.

Controllable array sorting device 100 is configured to communicate with object recognition device 106, which is located above conveyor device 104 (or in any position providing sensor coverage of conveyor device 104), and sorting control device (not shown). Object recognition device 106 includes one or more sensors (e.g., an infrared camera, visual spectrum camera, volumetric sensor, or some combination thereof) that point down towards conveyor device 104 and have a clear view of the items being transported along conveyor device 104. In some embodiments, the items are sensed by a series of different sensors, where a later sensor in the series could refine data sensed by an earlier sensor in the series. Object recognition device 106 is configured to continuously/periodically capture sensed data (e.g., one or more images) of the items that are transported by conveyor device 104 toward controllable array sorting device 100. In some embodiments, object recognition device 106 and/or the sorting control device are combined with controllable array sorting device 100. In some embodiments, object recognition device 106 is configured to send sensed data to a sorting control device (not shown in FIG. 1) for the sorting control device to analyze each set of sensed data using a trained machine learning model to identify one or more target items among the items shown in the sensed data. The sorting control device is then configured to send to controllable array sorting device 100 control signals indicating the target items that controllable array sorting device 100 should perform a sorting action on after the target items fall off of conveyor device 104. In some embodiments, controllable array sorting device 100 performing a sorting action on a target item is sometimes referred to as "firing on" the target item. In one specific example, the sorting control device is configured to identify target items based on the determined material type associated with those target items. For example, target items are associated with material types that are desirable (e.g., recyclable). In another specific example, the sorting control device is configured to identify target items based on the shape, dimensions, and/or color of the items. For example, target items are a cluster of objects (e.g., a cluster of green beans) that match a set of desirable criteria. In some embodiments, the sorting control device is configured to determine one or more of the following pieces of information: where a target item is located along the width of conveyor device 104, when object recognition device 106 has obtained sensed data associated with the target item, and the approximate geometry (e.g., length and width) and/or mass of the target item. Based at least on the determined information, the sorting control device is configured to determine when a target item is to fall off of conveyor device 104 and, at that point, how controllable array sorting device 100 should use its diverting mechanisms to perform the sorting action on (e.g., to deflect) the target item. In various embodiments, a first aspect of controlling how controllable array sorting device 100 should use its diverting mechanisms to perform a sorting action is determining how many diverting mechanisms (which is also sometimes referred to as the "firing width") and which diverting mechanisms of its array will be used to deflect a target item. In some embodiments, a second aspect of controlling how controllable array sorting device 100 should use its diverting mechanisms to perform a sorting action is determining for how long (which is also sometimes referred to as the "firing duration") the selected diverting mechanisms will be activated to deflect the target item. For example, if the diverting mechanisms of controllable array sorting device 100 were air orifices, then a greater number of diverting mechanisms is selected and/or caused to shoot air for a longer duration for a target item that is determined to have a larger geometry (e.g., a larger bounding box) and/or mass than for a target item that is determined to have a smaller geometry (e.g., a smaller bounding box) and/or mass. In another example, controllable array sorting device 100 is configured to activate diverting mechanisms located on its left side if the target item is located on that side of conveyor device 104. In various embodiments, a third aspect of controlling how controllable array sorting device 100 should use its diverting mechanisms to perform a sorting action is determining when its selected diverting mechanisms will be activated to deflect a target item.

In some embodiments, additional factors that the sorting control device may use to control how controllable array sorting device 100 will use its diverting mechanisms (e.g., when to fire) include the (e.g., detected) speed of conveyor device 104, heuristics (e.g., the orientation of the target item, the type of material of the target item), and the distance between controllable array sorting device 100 and object recognition device 106.

In response to receiving a control signal from the sorting control device, controllable array sorting device 100 is configured to activate the selected subset of diverting mechanisms that are instructed by the control signal to perform a sorting action on a target item at a time after which the target item has fallen off of conveyor device 104. In a first example, if the diverting mechanisms in controllable array sorting device 100 are air orifices, then the selected subset of air orifices would be activated by releasing pressurized airflows out of those air orifices so that the airflows can hit the target item and deflect the target item into a collection container. In a second example, if the diverting mechanisms in controllable array sorting device 100 are paddles, then the selected subset of paddles would be activated by actuating the paddles so that they swing towards the target item to deflect the target item into a collection container.

In some embodiments, controllable array sorting device 100 may not be instructed by the sorting control device to perform a sorting action on a target item at all if suppression criteria with respect to the target item is met. As described above, the selected diverting mechanisms of controllable array sorting device 100 are to physically deflect (e.g., using a vacuum, a positive airflow, or a paddle making contact with the target item) the target item into a collection container. However, it is possible that the physical deflection aimed at the target item could inadvertently also deflect a non-target item into the collection container intended for the target item. The result of inadvertently deflecting a non-target item into the collection container is that the purity level of items collected in one or more collection container (s) would decrease, which is undesirable. For example, the "purity level" corresponding to items deposited into one or more collection containers can be defined as either 1) the total number of collected target items over the total number of all items collected at the collection container(s) or 2) the total weight of collected target items over the total weight of all items collected at the collection container(s). Typically, the greater the purity level of items collected at the collection container(s), the greater the (e.g., economic) value that is associated with the collected items. As such, it is undesirable to allow neighboring non-target items to be inadvertently deposited into a collection container when controllable array sorting device 100 performs a sorting action on a target item because doing so will lower the purity level associated with items collected at the collection container. As will be described in further detail below, in some embodiments, a sorting control device is configured to determine a set of non-target items that are neighbors to a target item on a conveyor device based on the sensed data. Then, the sorting control device is configured to determine whether a controllable array sorting device should perform a sorting action on the target item based on comparing attribute information associated with the target item with attribute information associated with the set of neighboring non-target items relative to the target item. If the sorting control device determines that the controllable array sorting device should perform a sorting action on the target item, then the sorting control device will instruct the controllable array sorting device to perform a sorting action with respect to the target item. Otherwise, if the sorting control device determines that the controllable array sorting device should not perform a sorting action (thereby, "suppressing" fire) on the target item, then the sorting control device will not instruct the controllable array sorting device to perform a sorting action with respect to the target item.

While the diverting mechanisms of controllable array sorting device 100 shown in FIG. 1 point downwards toward conveyor device 104, in some embodiments, the diverting mechanisms of a controllable array sorting device can be configured to point in any other direction relative to the adjacent conveyor device. In some embodiments, each diverting mechanism of the array can be actuated to rotate around an axis in order to deflect target items into different directions.

In some embodiments, the height at which controllable array sorting device 100 is placed relative to the surface of conveyor device 104 depends on the type of diverting mechanisms that is included in diverting mechanism array 102. For example, if the diverting mechanisms of diverting mechanism array 102 included air orifices that can emit positive airflows, then controllable array sorting device 100 can be set to be higher relative to the surface of conveyor device 104 because the emitted airflows can deflect the trajectory of target items that fall off of conveyor device 104 without the air orifices needing to physically contact the target items. In contrast, if the diverting mechanisms of diverting mechanism array 102 included actuatable paddles, then controllable array sorting device 100 would need to be set to be lower relative to the surface of conveyor device 104 because when the paddles are actuated to deflect the target items, the actuated paddles need to directly contact the target items.

While controllable array sorting device 100 shown in FIG. 1 features an array of diverting mechanisms, in some other embodiments, a controllable array sorting device may include more than one array of diverting mechanisms that form a two-dimensional plane of diverting mechanisms or multiple planes of diverting mechanisms that form a three-dimensional arrangement of diverting mechanisms. In some embodiments, a controllable array sorting device may include more than one array of diverting mechanisms and where each array of diverting mechanisms points in a different direction (e.g., because different types of target items may need to be deflected in different directions toward the respective locations of their collection containers). In some embodiments, individual or groups of diverting mechanisms can be controlled independently or in combination to move target objects through the three-dimensional space. In such embodiments, the sorting control device is configured to send control signals to such subsets of the diverting mechanism array in order to effectuate the desired motion of the target object. In addition to spatial control of diverting mechanism array 102, the sorting control device is configured to provide control signals that may vary over time or array location based upon the control system logic implemented. Examples of control system logic implemented to provide appropriate control signals are Kalman filters, traditional feedback control (e.g., PID controller), or alternative control algorithms based upon machine learning.

Figure 2:
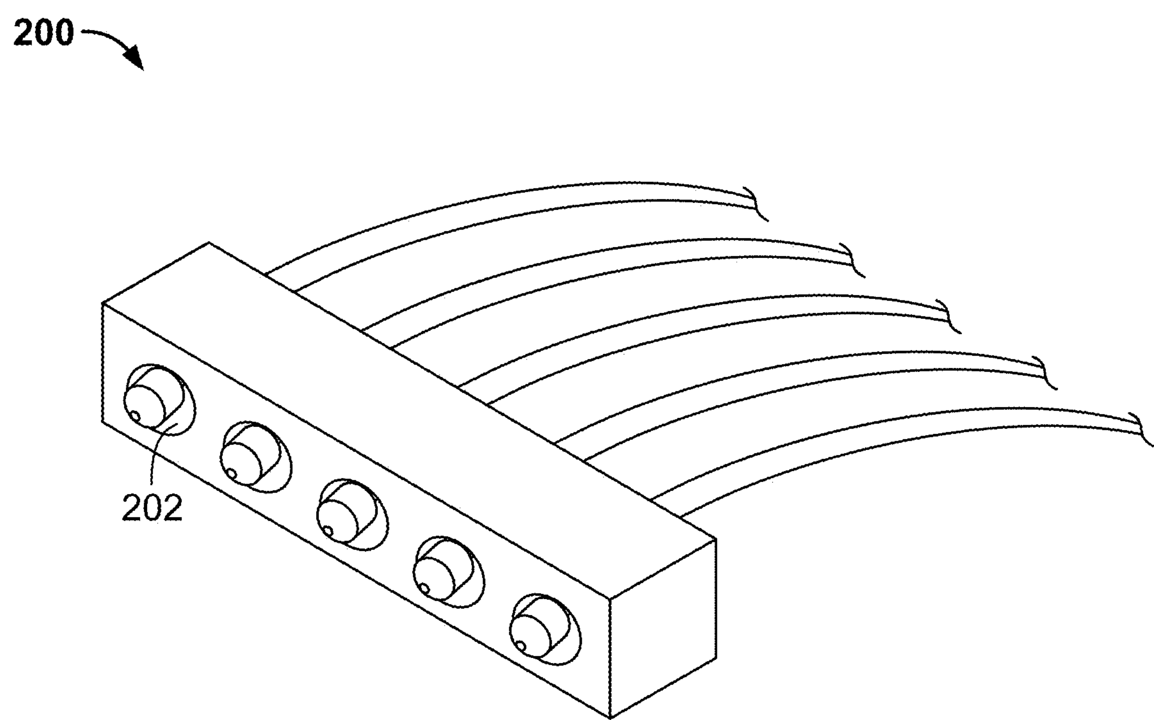
FIG. 2 is a diagram that shows a linear array of diverting mechanisms belonging to a controllable array sorting device.

In some embodiments, diverting mechanism array 102 of controllable array sorting device 100 may include one or more linear (straight) rows of diverting mechanisms (as shown in FIG. 2, below). In some embodiments, diverting mechanism array 102 of controllable array sorting device 100 may include one or more non-linear (e.g., a curved) rows of diverting mechanisms (as shown in FIG. 3, below).

FIG. 2 is a diagram that shows a linear array of diverting mechanisms belonging to a controllable array sorting device. In some embodiments, diverting mechanism array 102 of controllable array sorting device 100 of FIG. 1 may be implemented using one or more of array of diverting mechanisms 200. Array of diverting mechanisms 200 includes a linear row of diverting mechanisms. In the example of FIG. 2, each diverting mechanism of array of diverting mechanisms 200 such as diverting mechanism 202 is an air orifice that is connected to a (pressurized) air source. Given the linear arrangement of the diverting mechanism of array of diverting mechanisms 200, each diverting mechanism (air orifice) can emit an airflow at a target item to deflect the target item in a direction that is orthogonal to the plane that includes array of diverting mechanisms 200. For example, an air orifice comprises an air opening. In another example, the air orifice may comprise an air knife, which comprises a series/collection of small air apertures.

Figure 3:
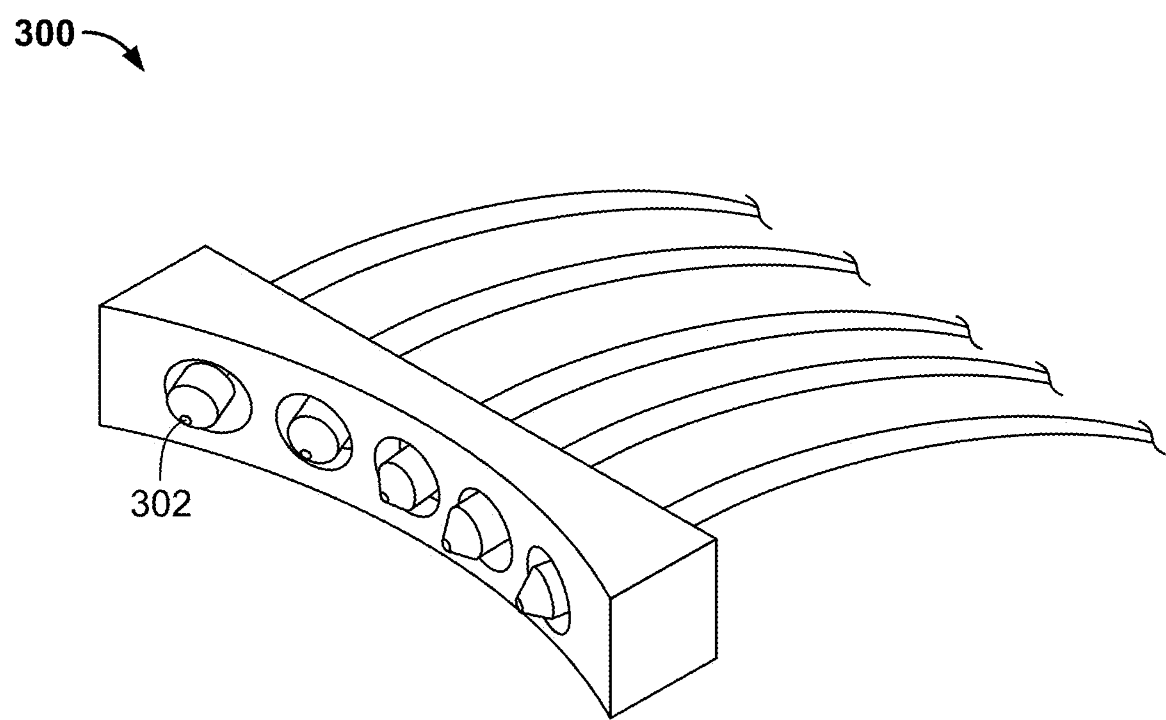
FIG. 3 is a diagram that shows a non-linear array of diverting mechanisms belonging to a controllable array sorting device.

FIG. 3 is a diagram that shows a non-linear array of diverting mechanisms belonging to a controllable array sorting device. In some embodiments, diverting mechanism array 102 of controllable array sorting device 100 of FIG. 1 may be implemented using one or more of array of diverting mechanisms 300. Array of diverting mechanisms 300 includes a non-linear (curved) row of diverting mechanisms. In the example of FIG. 3, each diverting mechanism of array of diverting mechanisms 300 such as diverting mechanism 302 is an air orifice that is connected to a (pressurized) air source. Given the non-linear arrangement of the diverting mechanism of array of diverting mechanisms 300, one or more diverting mechanisms (air orifices) can emit (e.g., a combination of) airflows at a target item to deflect the target item in a particular direction away from the plane that includes array of diverting mechanisms 300. For example, an air orifice comprises an air opening. In another example, an air orifice may comprise an air knife, which comprises a series/collection of small air apertures.

Figure 4:
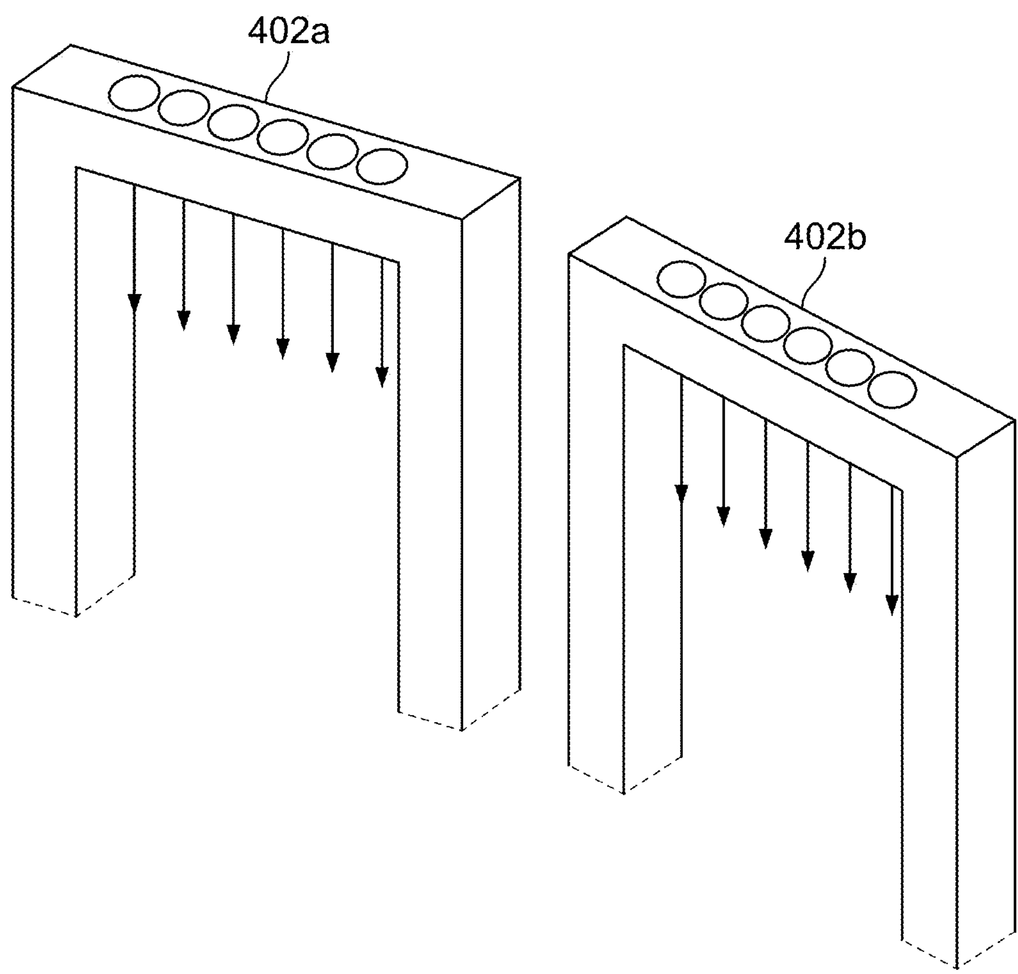
FIG. 4 is a diagram showing examples of modular controllable array sorting devices.

FIG. 4 is a diagram showing examples of modular controllable array sorting devices. Manufacturing controllable array sorting devices with a predetermined number of diverting mechanisms can be easier accomplished at scale, rather than manufacturing controllable array sorting devices with a variable/custom number of diverting mechanisms for each use particular application of the controllable array sorting device. As such, in some embodiments, a controllable array sorting device can be implemented in "modular form," where each controllable array sorting device includes one of a predetermined number of diverting mechanisms. The predetermined number of diverting mechanisms can be selected to be a minimum unit or number of diverting mechanisms that is expected for an application. Then, for each use case, one or more modular controllable array sorting devices can be employed (e.g., arranged side-by-side or front-to-back at the end of a conveyor device) to perform sorting actions on target items that fall off of a conveyor device. When arranged side-by-side, the arrays of diverting mechanisms across all of the modular controllable array sorting devices can collectively form one aggregated array of diverting mechanisms that spans at least the width of the conveyor device. When arranged front-to-back, the arrays of diverting mechanisms across all of the modular controllable array sorting devices can collectively form one two-dimensional plane of diverting mechanisms that comprises a width of at least two arrays of diverting mechanisms. In some embodiments, the combination of more than one modular controllable array sorting device can be treated as a single controllable array sorting device (e.g., the arrays of diverting mechanisms across multiple modular controllable array sorting devices can be controlled by a single sorting control device in performing the sorting action on a target item). Besides cost savings in manufacturing modular controllable array sorting devices, multiple modular controllable array sorting devices can also be advantageously arranged side-by-side at different angles relative to each other so as to form an aggregated array of diverting mechanisms across the sorting devices that is of a non-linear shape, if desired.

In the example of FIG. 4, modular controllable array sorting device 402*a* and modular controllable array sorting device 402*b* each includes an array of six diverting mechanisms. Modular controllable array sorting device 402*a* and modular controllable array sorting device 402*b* can be thought of as two instances of the same type of modular controllable array sorting device. As shown in the example of FIG. 4, modular controllable array sorting device 402*a* and modular controllable array sorting device 402*b* are placed side-by-side relative to each other at a slight angle so as to form a non-linear aggregated array of twelve diverting mechanisms across the two modular controllable array sorting devices. Additional instances of the modular controllable array sorting device can be placed on either side of modular controllable array sorting device 402*a* and modular controllable array sorting device 402*b* so as to increase the length of the aggregated array of diverting mechanisms that is collectively formed by all of the modular controllable array sorting devices.

Figures 5A, 5B:
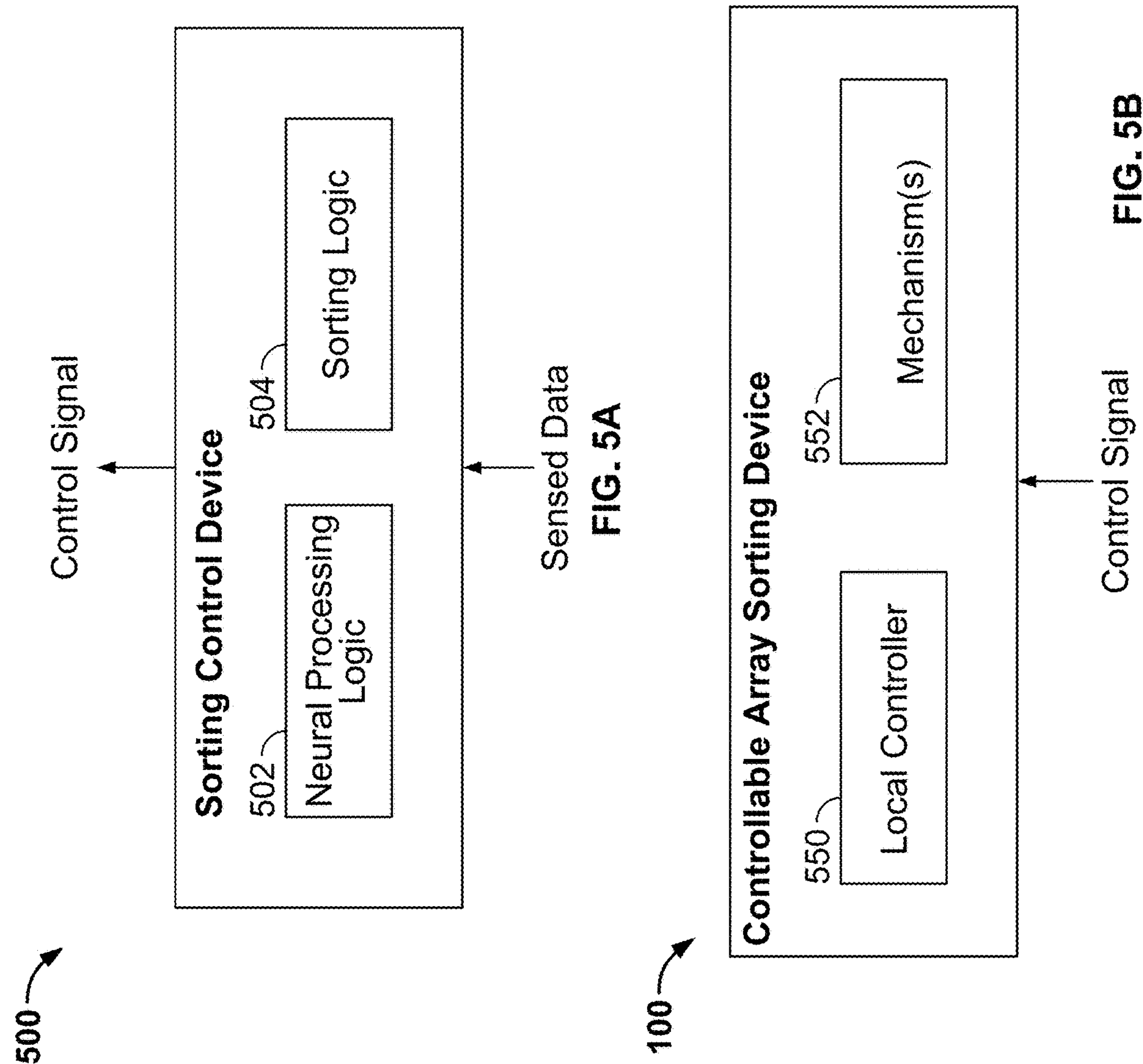
FIG. 5A is a diagram showing an example of a sorting control device.
FIG. 5B is a diagram showing an example of a controllable array sorting device.

FIG. 5A is a diagram showing an example of a sorting control device. In some embodiments, a sorting control device portion of FIG. 1 may be implemented using sorting control device 500 of FIG. 5A. In the example of FIG. 5A, sorting control device 500 includes neural processing logic 502 and sorting logic 504. Each of neural processing logic 502 and sorting logic 504 may either be implemented together on a common physical non-transient memory device, or on separate physical non-transient memory devices. In various embodiments, each of neural processing logic 502 and sorting logic 504 may be implemented using one or more microprocessors coupled to one or more memories that are programmed to execute code to carry out the functions of corresponding neural processing logic 502 and sorting logic 504 described herein. In other embodiments, each of neural processing logic 502 and sorting logic 504 may additionally, or alternately, be implemented using an application specific integrated circuit (ASIC) or field programmable gate array (FPGA) that has been adapted for machine learning.

Neural processing logic 502 is configured to receive raw sensed data (which in the case of a camera sensor may comprise image frames, for example) from an object recognition device. Neural processing logic is configured to provide the received sensed data as input to one or more neural network and artificial intelligence techniques to locate and identify items appearing within the image frames that are potentially target items. As the term is used herein, an “image frame” is intended to refer to a collection or collected set of sensed data captured by an object recognition device that may be used to capture the spatial context of one or more potential items on a conveyor device along with characteristics about the items. A feed of image frames captured by an object recognition device is fed, for example, to a machine learning inference technique. The sequence of captured image frames may be processed by multiple processing layers, or neurons, to evaluate the correlation of specific features with features of items that it has previously learned. Alternative techniques to detect items within an image include Fully Convolutional Neural Network, Multibox, Region-based Fully Convolutional Networks (R-FCN), Faster R-CNN, and other techniques such as object detection, instance-aware segmentation, or semantic segmentation techniques.

Among the recognized items, neural processing logic 502 is configured to discriminate between target and non-target items based on a reconfigurable and dynamic set of target item criteria. For example, the set of target item criteria can describe which types of items are considered to be “target items” (e.g., and therefore should have sorting actions be performed on them), while items that do not match the set of target item criteria are considered to be “non-target items” (e.g., and therefore should not have sorting actions be performed on them). For example, the set of target item criteria may describe a set of attribute information (e.g., target material type, and/or other target item shape/dimensions/color) for which a matching item is considered to be a “target item.” For example, a matching item can be a single object (e.g., an aluminum can) or a cluster of objects (e.g., a cluster of grapes or a cluster of green beans). In various embodiments, the set of target item criteria that is configured for a particular sorting control device may be specifically configured for that particular sorting control device and may differ from the set of target item criteria that is configured for a different sorting control device. Put another way, different sorting control devices may consider different types of items to be target items depending on their respective sets of target item criteria. In various embodiments, a sorting control device's set of target item criteria may be reconfigured/updated/modified to cause the sorting control device to identify different items to be “target items” over time. In some embodiments, in response to detected events, tunable parameters associated with the material recovery facility, including a sorting control device's set of target item criteria can be reconfigured.

Based on the input sensed data (e.g., image frames) that is provided by an item recognition device, neural processing logic 502 is configured to determine information related to target items and non-target items that are being transported by the conveyor device. In some embodiments, the information related to target items that are determined by neural processing logic 502 includes attribute information. For example, attribute information includes one or more of, but not limited to, the following: a material type associated with each item, an approximate mass associated with each item, an associated geometry associated with each item, dimensions (e.g., height and width/area) associated with each item, a designated deposit (e.g., collection container) location associated with each item, and an orientation associated with each item. In some embodiments, the information related to items that are determined by neural processing logic 502 includes location information. For example, location information includes one or more coordinates at which each item was located in the image frame(s) that were input into neural processing logic 502. In a specific example, the location information of each item is the coordinate of the centroid of the item. Neural processing logic 502 is configured to send the attribute information and location information of target items and non-target items to sorting logic 504.

Sorting logic 504 is configured to select, for each target item that has been identified by neural processing logic 502, at least a subset of a set of diverting mechanisms that is associated with the controllable array sorting device to use to perform a sorting action on that target item. A particular subset of the diverting mechanisms is dynamically selected to perform a sorting action on each target item so as to ensure a sufficiently strong but focused deflection of the target item into a collection mechanism. In some embodiments, the selected subset of diverting mechanisms includes a number of contiguous diverting mechanisms as well as the location along the array of diverting mechanisms at which the selected number of diverting mechanisms are located. In some embodiments, the number of contiguous diverting mechanisms (which is sometimes called a “firing width”) that is selected by sorting logic 504 is based at least in part on an attribute of the target item. For example, the number of contiguous diverting mechanisms that is selected by sorting logic 504 is based at least in part on an approximate mass or an associated geometry of the target item. For example, the larger the mass or the larger the associated geometry of the target item, the greater the number of diverting mechanisms that would be selected by sorting logic 504 to perform the sorting action. In some embodiments, where along the array of diverting mechanisms of the controllable array sorting device the selected number of diverting mechanisms is located is determined based at least in part on the location information (e.g., centroid) of the target item on the surface of the conveyor device. For example, the location of the target item along the width of the conveyor device is used by sorting logic 504 to determine the selected number of diverting mechanisms of the controllable array sorting device that are (e.g., have an average location that is) the closest to the location of the target item. In some embodiments, where the controllable array sorting device includes more than one array of diverting mechanisms and where the diverting mechanisms in different arrays are configured to deflect target items in different directions, sorting logic 504 is also configured to select the location of the selected number of diverting mechanisms among a particular array that is configured to deflect the target item into a direction in which a collection container corresponding to that target item is located.

In some embodiments, where the diverting mechanisms of the controllable array sorting device can be activated to continuously or repeatedly perform the sorting action for a duration of time, sorting logic 504 is configured to determine a duration of time during which the selected subset of diverting mechanisms is to be activated. For example, where the diverting mechanisms of the controllable array sorting device comprise air orifices that are connected to pressurized air sources, a duration of time during which the selected diverting mechanisms (air orifices) are to emit positive airflows can be determined. In some embodiments, the duration/length of time over which the selected subset of diverting mechanisms is to perform the sorting action (which is sometimes called a “firing duration”) that is determined by sorting logic 504 is based at least in part on an attribute of the target item. For example, the duration/length of time that is selected by sorting logic 504 is based at least in part on an approximate mass or an associated geometry of the target item. For example, the larger the mass or the larger the associated geometry of the target item, the greater the duration of time that would be selected by sorting logic 504 to perform the sorting action. One reason for sorting logic 504 to tailor the selection of a particular subset of diverting mechanisms and also the duration over which the selected subset of diverting mechanisms is to perform a sorting action for each target item is to surgically aim the sorting action on the target item to both successfully deflect the target item into a collection container (e.g., by using an appropriate force to deflect the target item) and to minimize the probability of inadvertently deflecting a nearby non-target item into a collection container (e.g., by focusing the force on the location of the target item). In some embodiments, the activating the selected subset of diverting mechanisms of the controllable array sorting device over the determined duration of time comprises sending one or more control signals to the controllable array sorting device to cause the sorting device to fire the selected subset of diverting mechanisms continuously for the duration of time. In some embodiments, the activating the selected subset of diverting mechanisms of the controllable array sorting device over the determined duration of time comprises sending one or more control signals to the controllable array sorting device to cause the sorting device to fire the selected subset of diverting mechanisms intermittently for the duration of time. In some embodiments, the activating the selected subset of diverting mechanisms of the controllable array sorting device over the determined duration of time comprises sending one or more control signals over the duration of time to the controllable array sorting device to cause the sorting device to fire once or more per each received control signal. In some embodiments, the activating the selected subset of diverting mechanisms of the controllable array sorting device over the determined duration of time comprises sending one or more control signals to the controllable array sorting device to cause the sorting device to start firing the selected subset of diverting mechanisms in response to a start control signal and to stop firing in response to a stop control signal.

Sorting logic 504 is configured to determine whether to instruct to a controllable array sorting device to either perform a sorting action on a target item or suppress (e.g., omit) the performance of the sorting action on the target item based on the information (e.g., attribute information and location information) associated with that target item and its neighboring non-target items that it receives from neural processing logic 502. In some embodiments, sorting logic 504 is configured to determine, for each target item, whether the performance of a sorting action on the target item (e.g., the removal of that target item from the stream of items) should be suppressed (e.g., avoided/omitted) using a reconfigurable set of suppression criteria. As described above, it is possible that the physical deflection aimed at the target item by the selected subset of diverting mechanisms could inadvertently also deflect a non-target item into the collection container intended for the target item. Also, as described above, it is undesirable to allow neighboring non-target items to be inadvertently deposited into a collection container when a controllable array sorting device deflects a target item because doing so will lower the purity level associated with items collected at the collection container. For example, the set of suppression criteria describes the conditions for when a controllable array sorting device should not remove a target item from the stream of items (to reduce the risk that the non-target item also inadvertently becomes deposited into a collection container). In some embodiments, the set of suppression criteria may describe to first determine for a target item, a set of neighboring non-target items relative to the target item. In a first example, the set of neighboring non-target items is determined as non-target items whose shortest distances to the target item as measured between the respective polygon of the target item and the respective polygons of the non-target items are below a predetermined proximity threshold. In a second example, the set of neighboring non-target items is determined as non-target items whose shortest distances to the target item as measured between the centroid of the target item and the respective centroids of the non-target items are below a predetermined proximity threshold. In some embodiments, the set of suppression criteria may describe to then determine for a target item, a comparison (e.g., a ratio) between an attribute of the target item to an aggregate attribute associated with the set of neighboring non-target items that had been determined for the target item. The comparison will be used by sorting logic 504 to determine whether to instruct the controllable array sorting device to perform a sorting action on the target item or to suppress firing on the target item by not instructing the controllable array sorting device to perform a sorting action on the target item (to reduce the risk that the non-target item becomes deposited into a collection container). For example, the approximate mass of the target item can be compared to the aggregated approximate masses of the set of neighboring non-target items and this ratio can be compared to a predetermined ratio threshold. If the ratio is greater than the predetermined ratio threshold, sorting logic 504 is configured to instruct the controllable array sorting device to perform the sorting action on the target item.

For the target items that sorting logic 504 determines should be fired on (e.g., removed from the stream of materials), in some embodiments, sorting logic 504 is configured to determine the manner in which those target items are to be removed using a reconfigurable set of removal parameters. For example, the set of removal parameters describes, but is not limited to, one or more of the following: which collection containers to deposit target items of different material types and how much force/pressure to use to remove the target items from the stream and into corresponding collection containers. Sorting logic 504 is configured to send control signals to at least one corresponding controllable array sorting device to instruct that at least one controllable array sorting device which target items on which to perform sorting actions and how to do so (e.g., using which subset of diverting mechanisms, how long to fire those diverting mechanisms for, and/or using what degree of force to fire on the target items). In some embodiments, in response to detected events, tunable parameters associated with the material recovery facility, including a set of suppression criteria and a set of removal parameters, can be reconfigured.

FIG. 5B is a diagram showing an example of a controllable array sorting device. In some embodiments, controllable array sorting device 100 of FIG. 1 may be implemented using the example sorting device of FIG. 5B. In the example of FIG. 5B, the example controllable array sorting device includes local controller 550 and array(s) of diverting mechanism(s) 552. In various embodiments, local controller 550 may be implemented using one or more processors or a microcontroller.

In some embodiments, array(s) of diverting mechanism(s) 552 are array(s) of air orifices that are connected to one or more sources of pressurized air (not shown in FIG. 5B) via one or more manifolds (e.g., not shown in FIG. 5B). For example, an air orifice comprises a single air nozzle. In another example, an air orifice is an air knife that comprises a series of small apertures. The air orifices can be activated by local controller 550 to emit airflows that will deflect target items into respective collection containers. For example, to activate airflows to be shot from the air orifices, local controller 550 is configured to control pressurized air to be supplied by one or more sources of pressurized air. Where array(s) of diverting mechanism(s) 552 are arrays of air orifices, in some embodiments, different arrays of diverting mechanisms are pointing in different directions. The air orifices can be activated by local controller 550 to shoot airflows continuously, intermittently, using a specified force of air, and/or for a specified duration of time. With respect to shooting airflows for a specified duration of time, the air orifices can be activated by local controller 550 to shoot continuously for the specified duration of time, shoot intermittently for the specified duration of time, shoot once or more per each control signal over the specified duration of time, and start shooting in response to a start control signal and stop shooting in response to a stop control signal.

In some embodiments, array(s) of diverting mechanism(s) 552 are array(s) of mechanical paddles. For example, a mechanical paddle is a short blade that is configured to swing/spring out in one direction and to retract back into its original position. The mechanical paddles can be activated by local controller 550 to swing/spring out and physically make contact with target items to deflect the target items into their respective collection containers. Where array(s) of diverting mechanism(s) 552 are arrays of air orifices, in some embodiments, different arrays of diverting mechanisms are pointing in different directions. The mechanical paddles can be activated by local controller 550 to swing/spring out and retract repeatedly, using a specified force of swing, and/or for a specified duration of time. With respect to swinging mechanical paddles for a specified duration of time, the mechanical paddles can be activated by local controller 550 to swing continuously for the specified duration of time, swing intermittently for the specified duration of time, swing once or more per each control signal over the specified duration of time, and start swinging in response to a start control signal and stop swinging in response to a stop control signal.

Local controller 550 is configured to receive control signals from an internal processor or an external/remote processor (e.g., associated with a cloud server or one or more sorting control devices) and to interpret the received control signals to actuate array(s) of diverting mechanism(s) 552 to perform the instructed sorting actions on the appropriate target items. For example, local controller 550 can determine when to actuate array(s) of diverting mechanism (s) 552 to fire, which subset of array(s) of diverting mechanism(s) 552 to fire, with what force (e.g., what pressure of airflows) array(s) of diverting mechanism(s) 552 should fire with, and/or for how long array(s) of diverting mechanism (s) 552 should continue to fire. In the specific example in which array(s) of diverting mechanism(s) 552 comprise array(s) of air orifices that are connected to pressured air sources, local controller 550 is configured to activate at least a subset of the air orifices of a specified array to shoot air at a particular time so that the airflow can deflect a target item into a collection container just after that target item falls off a conveyor device.

Figure 6A:
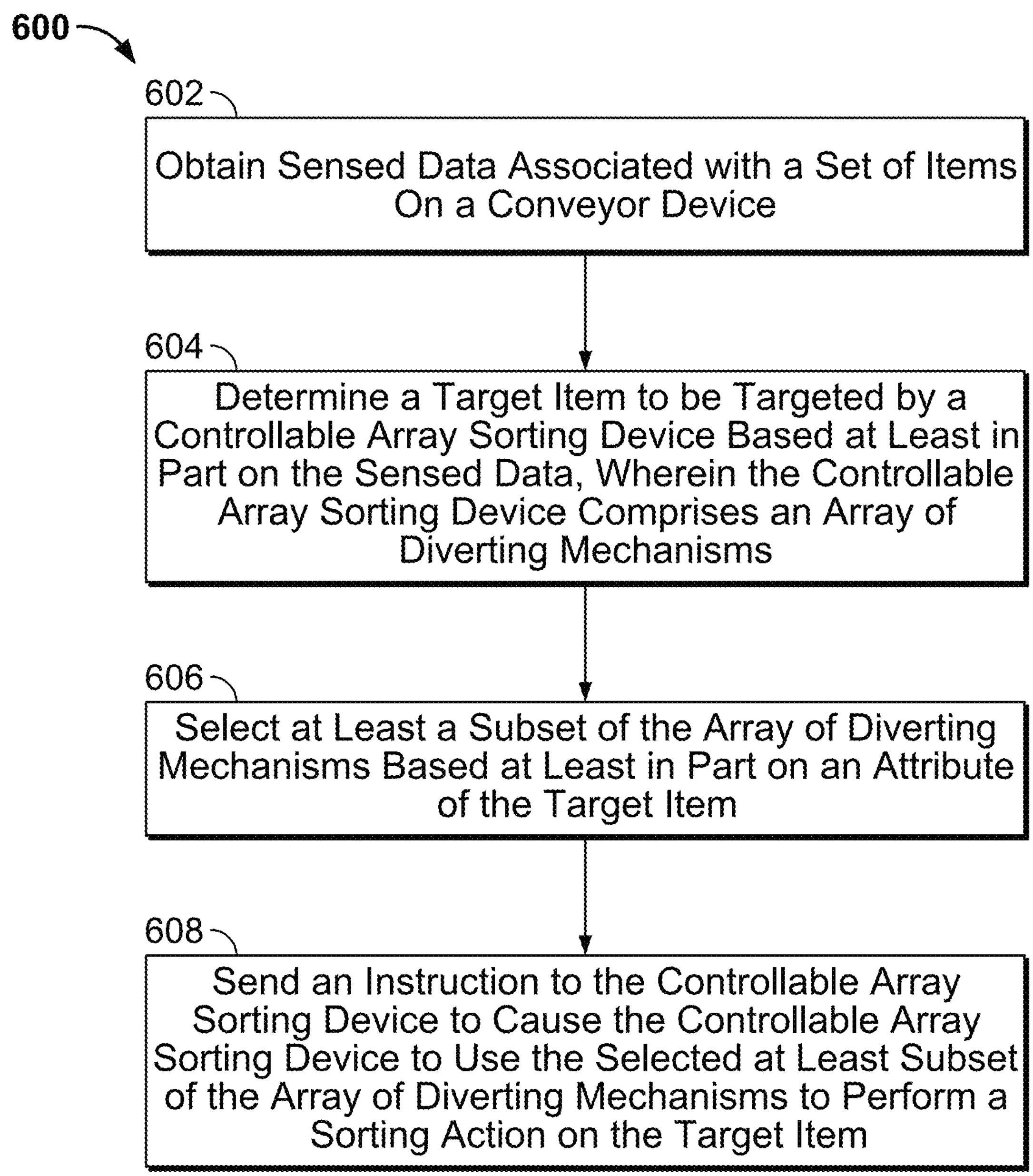
FIG. 6A is a flow diagram showing an embodiment of a process for using a controllable array sorting device.

FIG. 6A is a flow diagram showing an embodiment of a process for using a controllable array sorting device. In some embodiments, process 600 is implemented, at least in part, at a sorting control device such as the sorting control device that is included in FIG. 1 and sorting control device 500 of FIG. 5A. In some embodiments, process 600 is repeated as items move along on a conveyor device and new sensed data is generated based on the current items that are located on the conveyor device.

At 602, sensed data associated with a set of items on a conveyor device is obtained. In some embodiments, sensed data comprises one or more image frames of the items on the conveyor device that are captured by one or more camera sensors that are pointed at the surface of the conveyor device.

At 604, a target item to be targeted by a controllable array sorting device is determined based at least in part on the sensed data, wherein the controllable array sorting device comprises an array of diverting mechanisms. Attribute information and location information associated with the items identified in the sensed data are determined. For example, attribute information includes one or more of, but not limited to, the following: a material type associated with each item, an approximate mass associated with each item, an associated geometry associated with each item, dimensions (e.g., height and width/area) associated with each item, a designated deposit (e.g., collection container) location associated with each item, and an orientation associated with each item. For example, location information includes one or more coordinates at which each item was located in the image frame(s). In some embodiments, an item is determined to be a “target item” based on the item’s attribute and/or location information matching a set of target item criteria.

At 606, at least a subset of the array of diverting mechanisms is selected based at least in part on an attribute of the target item. At least a subset of the array of diverting mechanisms of a controllable array sorting device is selected to be used to perform a sorting action on the target item. In various embodiments, the subset of the array of diverting mechanisms of a controllable array sorting device is selected based on an attribute (e.g., a geometry, an approximate mass) of the target item and a location of the target item on the conveyor device. In some embodiments, where the controllable array sorting device includes more than one array of diverting mechanisms and where the diverting mechanisms in different arrays are configured to deflect target items in different directions, the location of the selected number of diverting mechanisms is selected to be among a particular array that is configured to deflect the target item into a direction in which a collection container corresponding to that target item is located. In some embodiments, a duration of time for which the selected at least subset of diverting mechanisms is to perform the sorting action on the target item is also determined based at least in part on an attribute (e.g., a geometry, an approximate mass) of the target item.

At 608, an instruction to the controllable array sorting device is sent to cause the controllable array sorting device to use the selected at least subset of the array of diverting mechanisms to perform a sorting action on the target item. In some embodiments, performing a sorting action on the target item is to deflect the target item into a corresponding collection container. In some embodiments, prior to sending an instruction (e.g., a control signal) to the controllable array sorting device, it is determined whether the performance of the sorting action on the target item should be suppressed (e.g., avoided) in an effort to avoid inadvertently potentially deflecting non-target item(s) that are close in proximity to the target item into the collection container of the target item along with the target item. Only if it is determined that performing the sorting action on the target item should not be suppressed is the instruction sent to the controllable array sorting device to cause the controllable array sorting device to perform the sorting action on the target item using the selected at least subset of diverting mechanisms. In some embodiments, the instruction specifies the selected at least subset of the array of diverting mechanisms to use to perform the sorting action, the duration of time for which to perform the sorting action, a time or other temporal element for when to (start to) perform the sorting action, and/or a degree of force (e.g., what pressure of airflows) to use in performing the sorting action. In some embodiments, the instruction specifies to perform the sorting action while the target item is still on the conveyor belt of a conveyor device. In some embodiments, the instruction specifies to perform the sorting action after the target item has fallen off of a conveyor device.

Figure 6B:
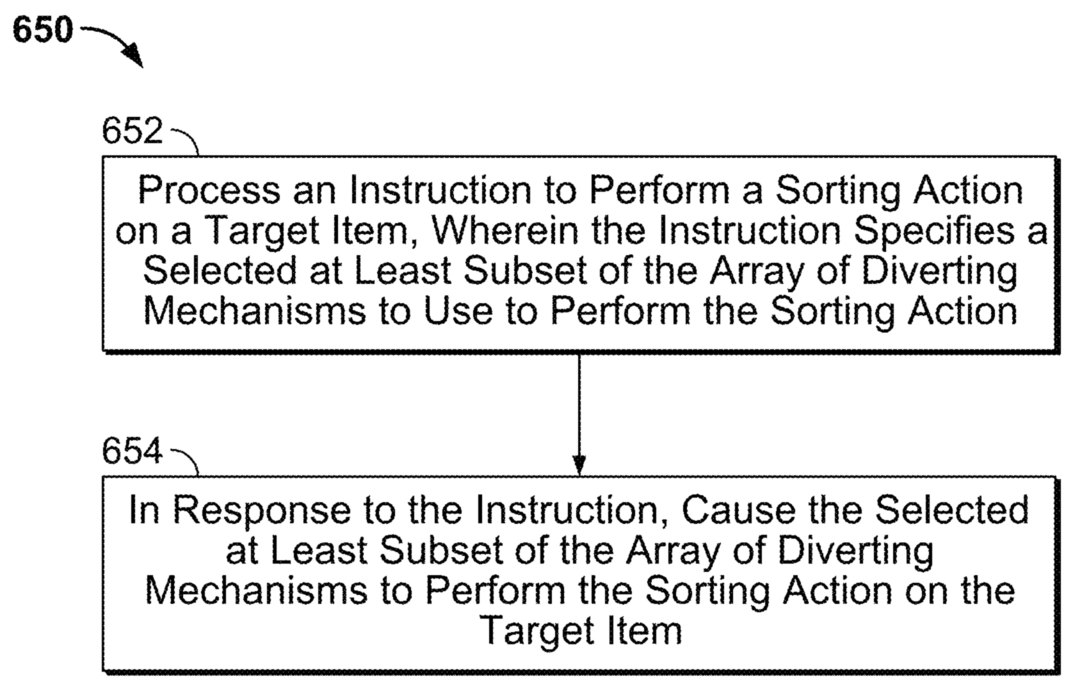
FIG. 6B is a flow diagram showing an embodiment of a process for performing a sorting action by a controllable array sorting device.

FIG. 6B is a flow diagram showing an embodiment of a process for performing a sorting action by a controllable array sorting device. In some embodiments, process 650 is implemented, at least in part, at a controllable array sorting device such as controllable array sorting device 100 that is included in FIG. 1 and the example controllable array sorting device of FIG. 5B.

At 652, an instruction to perform a sorting action on a target item is processed, wherein the instruction specifies a selected at least subset of the array of diverting mechanisms to use to perform the sorting action. In various embodiments, the instruction is received from a sorting control device. In some embodiments, the instruction is generated by a sorting control device using a process such as process 600 of FIG. 6A. In some embodiments, the instruction is generated by a processor that is local to the controllable array sorting device. In some embodiments, the instruction is received from a processor that is remote to the controllable array sorting device (e.g., a processor associated with a cloud server or with another compute device within the same facility). The instruction specifies which specific diverting mechanisms to use to perform the sorting action of deflecting the target item into a corresponding collection container. Where the controllable array sorting device includes more than one array of diverting mechanisms, the instruction may further specify one or more array(s) that should perform the sorting action. In some embodiments, the instruction specifies a duration of time for which to perform the sorting action. In some embodiments, the instruction specifies a degree of force (e.g., the pressure of the airflows that are to be emitted from diverting mechanisms that are air orifices) to use to perform the sorting action. In some embodiments, the instruction specifies a time, start/stop control signal, or other temporal related element for which the controllable array sorting device is to perform the sorting action.

At 654, in response to the instruction, cause the selected at least subset of the array of diverting mechanisms to perform the sorting action on the target item. The selected at least subset of the array of diverting mechanisms of the controllable array sorting device is activated to perform the sorting action on the target item in accordance with the zero or more other specified parameters of the instruction. For example, if the diverting mechanisms were air orifices, then, upon activation, the selected at least subset of the air orifices would emit pressurized airflows to deflect the target item into its corresponding collection container. In another example, if the diverting mechanisms were mechanical paddles, then, upon activation, the selected at least subset of the mechanical paddles would swing/spring out from their initial positions to make physical contact with the target item to deflect the target item into its corresponding collection container. In some embodiments, the selected at least subset of the array of diverting mechanisms performs the sorting action while the target item is still on the conveyor belt of a conveyor device. In some embodiments, the selected at least subset of the array of diverting mechanisms performs the sorting action after the target item has fallen off of a conveyor device.

Figure 7:
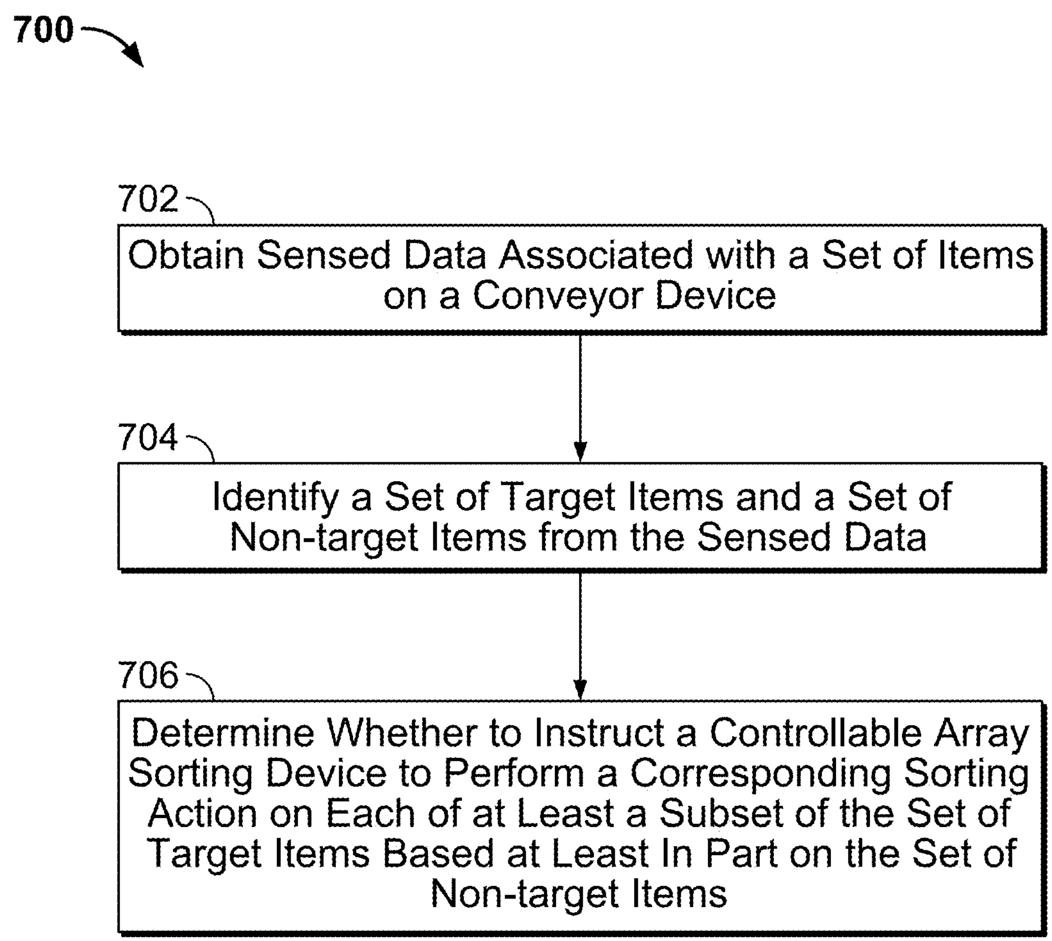
FIG. 7 is a flow diagram showing an example of a process for determining whether to suppress performing corresponding sorting actions on a set of target items.

FIG. 7 is a flow diagram showing an example of a process for determining whether to suppress performing corresponding sorting actions on a set of target items. In some embodiments, process 700 is implemented, at least in part, at a sorting control device such as the sorting control device that is included in FIG. 1 and sorting control device 500 of FIG. 5A. In some embodiments, process 600 of FIG. 6A is implemented at least in part, using process 700.

At 702, sensed data associated with a set of items on a conveyor device is obtained. In some embodiments, sensed data comprises one or more image frames of the items on the conveyor device that are captured by one or more cameras or other sensors that are pointed at the surface of the conveyor device.

At 704, a set of target items and a set of non-target items are identified from the sensed data. Attribute information and location information associated with the items identified in the sensed data are determined. In some embodiments, an item is determined to be a "target item" if the item's attribute and/or location information matches a set of target item criteria and the item is determined to be a "non-target item" if the item's attribute and/or location information does not match a set of target item criteria.

At 706, whether to instruct a controllable array sorting device to perform a corresponding sorting action on each of at least a subset of the set of target items is determined based at least in part on the set of non-target items. Whether a corresponding sorting action is to be performed on each target item is determined based at least in part on the non-target items that are located close enough to the target item on the conveyor device to be considered "neighbors," as will be further described in FIG. 8, below.

Figure 8:
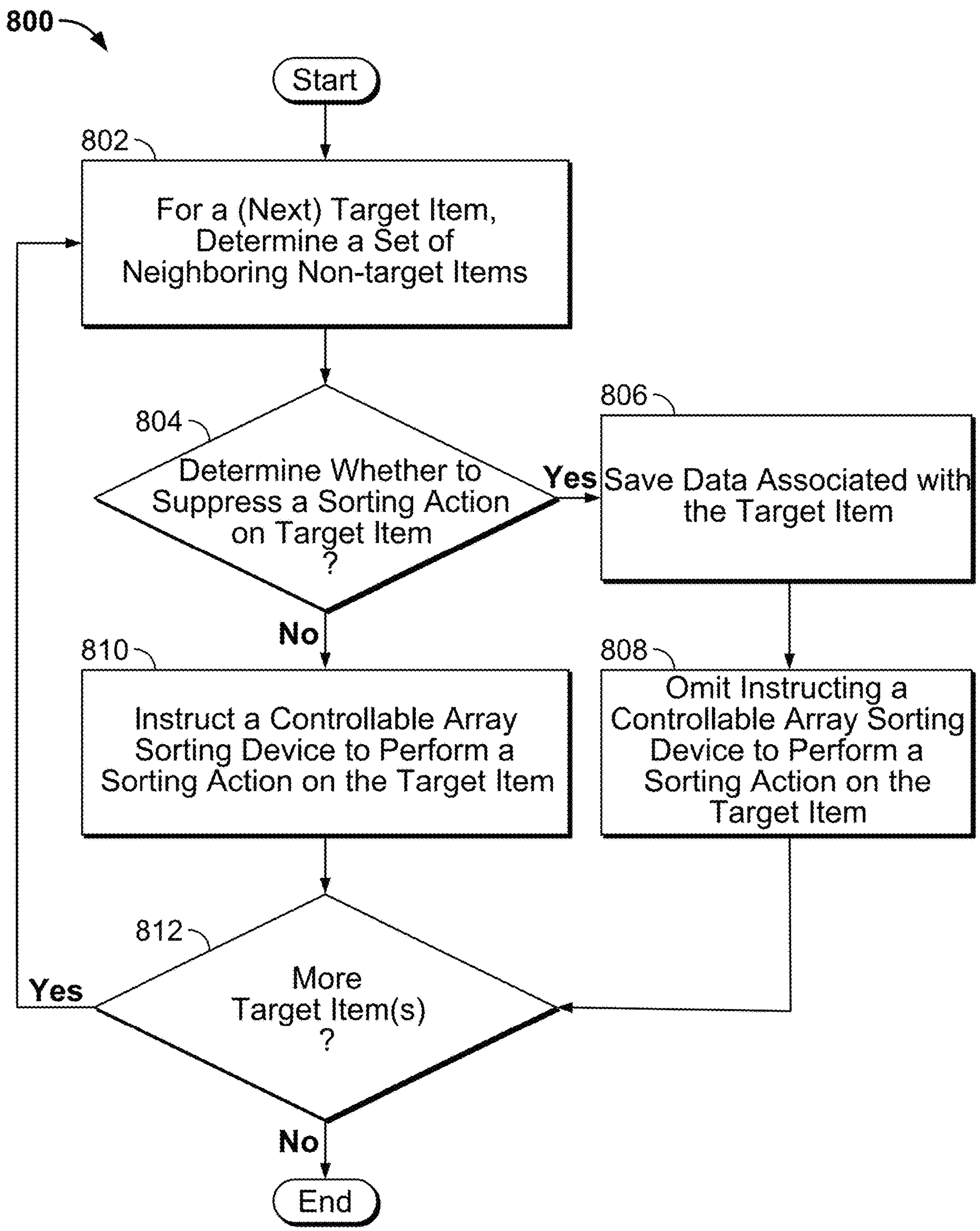
FIG. 8 is a flow diagram showing an example of a process for determining whether to suppress performing a sorting action on a target item.

FIG. 8 is a flow diagram showing an example of a process for determining whether to suppress performing a sorting action on a target item. In some embodiments, process 800 is implemented, at least in part, at a sorting control device such as the sorting control device that is included in FIG. 1 and sorting control device 500 of FIG. 5A. In some embodiments, step 706 of process 700 of FIG. 7 is implemented at least in part, using process 800.

Process 800 shows an example of a process that determines whether the performance of a sorting action on a target item should be suppressed based on the particular set of neighboring non-target items that has been determined specifically for that target item.

At 802, for a (next) target item, a set of neighboring non-target items is determined. For example, attribute information and location information on the target item and the non-target items are identified by neural processing logic using sensed data associated with items on a conveyor device.

In a first example, a corresponding polygon is determined for the target item and for each non-target item, for example, using the location information (e.g., centroid) of each item and the estimated geometry (e.g., length and width) of each item. Then, the respective shortest distance between the polygon of the target item and the polygon of each non-target item is determined. Those non-target items whose respective shortest distances from their respective polygons to the polygon of the target item that are below a predetermined proximity threshold are then determined as the set of neighboring non-target items for that target item.

In a second example, the respective distance between the centroid of the target item and the centroid of each non-target item is determined. Then, those non-target items whose respective distances from their respective centroids to the centroid of the target item that are below a predetermined proximity threshold are determined as the set of neighboring non-target items for that target item.

At 804, whether to suppress a sorting action on the target item is determined. In the event that suppression of a sorting action on the target item is determined, control is transferred to 806. Otherwise, in the event that suppression of a sorting action on the target item is not determined, control is transferred to 810.

In some embodiments, a comparison between an attribute of the target item is compared to the aggregated attribute of the set of neighboring non-target items that had been determined for that target item at step 802. In a first example, the approximate mass of the target item is compared to the aggregated/combined approximate mass of the set of neighboring non-target items for that target item. Then, if the ratio is above a predetermined threshold ratio, then the sorting action on the target item is determined to not be suppressed (e.g., because the relative mass of the target item to the collective mass of the non-target items is significant, and that therefore, the target item is relatively valuable and so the risk of inadvertently deflecting a non-target item into a collection container is acceptable). In a second example, the estimated volume of the target item is compared to the aggregated/combined estimated volume of the set of neighboring non-target items for that target item. Then, if the ratio is above a predetermined threshold ratio, then the sorting action on the target item is determined to not be suppressed (e.g., because the relative volume of the target item to the collective volume of the non-target items is significant, and that therefore, the target item is relatively valuable and so the risk of inadvertently deflecting a non-target item into a collection container is acceptable).

At 806, data associated with the target item is saved. If the sorting action on the target item is determined to be suppressed, that determination can be saved (e.g., and later analyzed to determine subsequent suppression criteria).

At 808, instructing a controllable array sorting device to perform a sorting action on the target item is omitted. If the sorting action on the target item is determined to be suppressed, then the controllable array sorting device is not instructed to fire on the target item and the target item is allowed to land onto the next surface in the sorting line in which the controllable array sorting device is located.

At 810, a controllable array sorting device is instructed to perform a sorting action on the target item. If the sorting action on the target item is not determined to be suppressed, then the controllable array sorting device is instructed to fire on the target item after the target item falls off the conveyor device and deflect the target item into a corresponding collection container.

At 812, whether there is at least one more target item is determined. In the event that there is at least one more target item, control is returned to 802 for the next target item. Otherwise, in the event that there are no more target items for which to determine whether a corresponding sorting action should be suppressed, process 800 ends.

Figure 9:
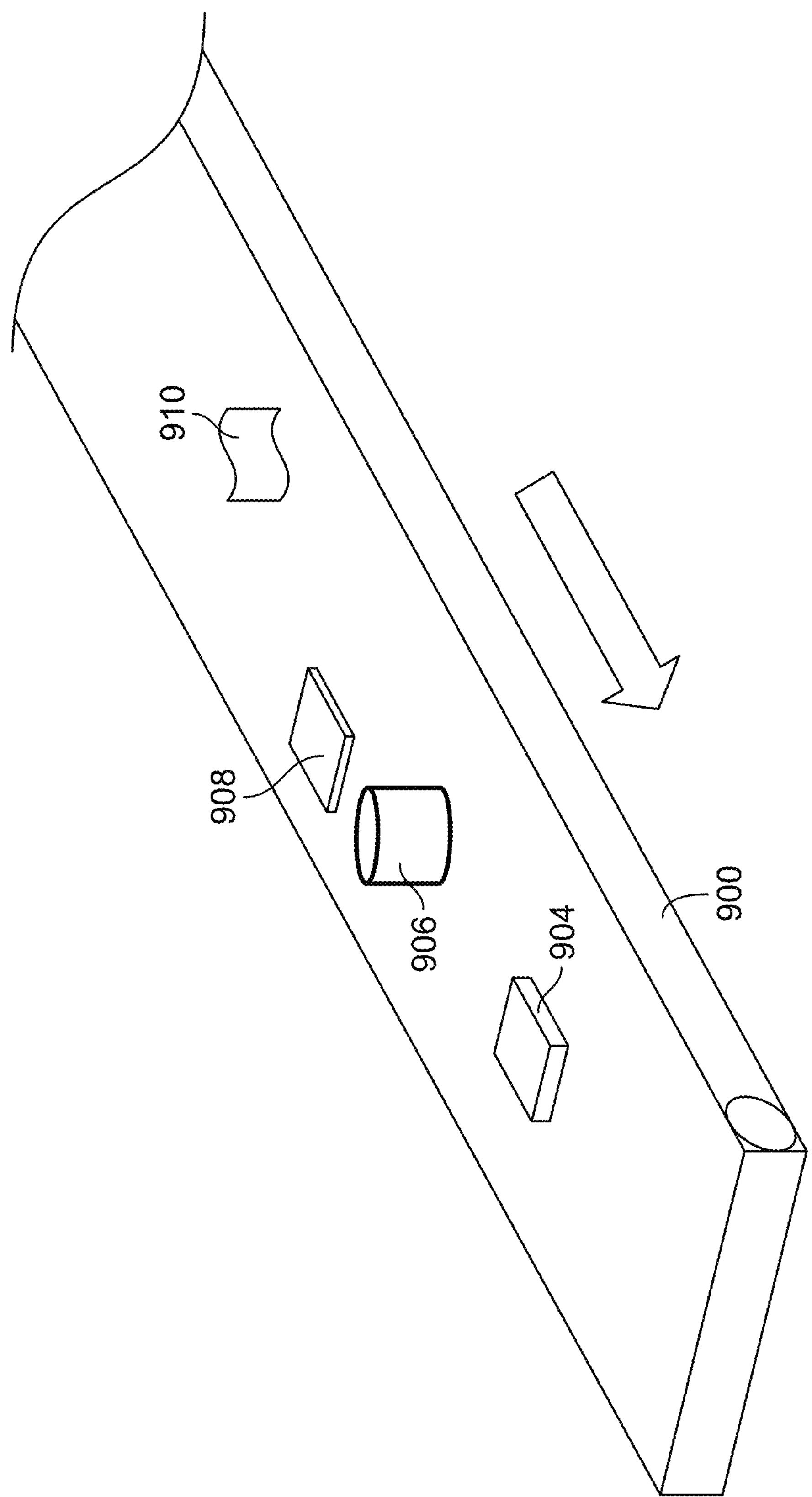
FIG. 9 is a diagram showing an example of a set of neighboring non-target items relative to a target item on a conveyor device.

FIG. 9 is a diagram showing an example of a set of neighboring non-target items relative to a target item on a conveyor device. As shown in the example of FIG. 9, at least items 904, 906, 908, and 910 are currently located on the conveyor belt of conveyor device 900. Based on sensed data with respect to the items (e.g., captured image frames of the items) on conveyor device 900, item 906 has been determined to be a target item (e.g., by a sorting control device based on a set of target item criteria) while items 904, 908, and 910 have been determined to be non-target items (e.g., by a sorting control device based on a set of target item criteria). In determining whether a sorting action on target item 906 should be suppressed or not, in some embodiments, a set of neighboring non-target items is first determined for target item 906. For example, a process such as process 800 of FIG. 8 can be used to determine the neighboring non-target items for target item 906. In one example technique of determining the neighboring non-target items for target item 906, a polygon that approximates the shape of target item 906 is determined and respective polygons that approximate the respective shapes of non-target items 904, 908, and 910 are also determined. Then, the respective shortest distances between the polygon of target item 906 and the respective polygon of each of non-target items 904, 908, and 910 are determined. The respective shortest distances between the polygon of target item 906 and the respective polygon of each non-target items 904, 908, and 910 are compared against a predetermined proximity distance. Only the shortest distances between the polygon of target item 906 and the respective polygons of non-target items 904 and 908 are determined to be less than the predetermined proximity distance and so therefore, only non-target items 904 and 908 (not non-target item 910) are determined to be neighboring non-target items relative to target item 906. As described by the example process of process 800 of FIG. 8, attribute information of target item 906 and aggregated attribute information associated with non-target items 904 and 908 are compared to determine whether a sorting action should be performed on target item 906 using a controllable array sorting device (that is not shown in FIG. 9 but would be located at the end of conveyor device 900 from which items fall from conveyor device 900).

Figure 10:
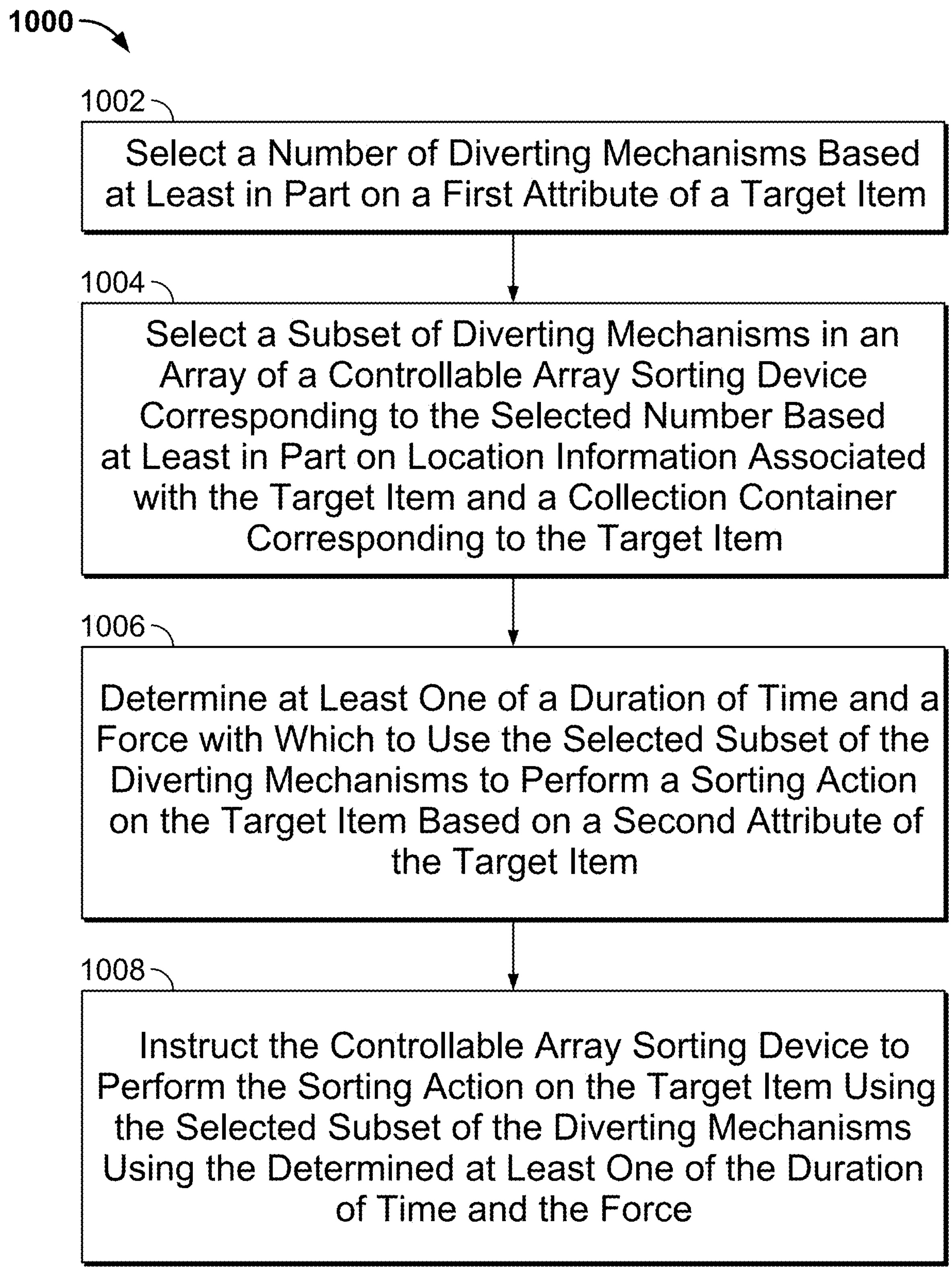
FIG. 10 is a flow diagram showing an example of a process for selecting a subset of diverting mechanisms of a controllable array sorting device for performing a sorting action on a target item.

FIG. 10 is a flow diagram showing an example of a process for selecting a subset of diverting mechanisms of a controllable array sorting device for performing a sorting action on a target item. In some embodiments, process 1000 is implemented, at least in part, at a sorting control device such as the sorting control device that is included in FIG. 1 and sorting control device 500 of FIG. 5A. In some embodiments, step 606 of FIG. 6A is implemented at least in part, using process 1000.

At 1002, a number of diverting mechanisms is selected based at least in part on a first attribute of a target item. In some embodiments, the number of contiguous diverting mechanisms that is selected to perform the sorting action of deflecting the target item is selected based on an approximate geometry (e.g., the width of the target item) and/or the approximate mass of the target item. For example, a target item that has a larger geometry and/or a larger mass will result in a larger number of diverting mechanisms being selected.

At 1004, a subset of diverting mechanisms in an array of a controllable array sorting device corresponding to the selected number is selected based at least in part on location information associated with the target item and a corresponding collection container associated with the target item. Which of the diverting mechanisms associated with a controllable array sorting device in the selected number of diverting mechanisms is to be selected is based on the location information (e.g., the coordinate of the centroid) of the target item on the conveyor device and also, the collection container corresponding to the target item. For example, the collection container corresponding to the target item may be determined by its material type and/or another characteristic of the target item. If the controllable array sorting device includes more than one array of diverting mechanisms that are configured to deflect target items into different directions and therefore, into different collection containers, then the subset of diverting mechanisms of the selected number is selected to be from the array of the controllable array sorting device that is configured to deflect target items into the collection container that corresponds specifically to the target item in question.

At 1006, the at least one of a duration of time and a force with which to use the selected subset of the diverting mechanisms to perform a sorting action on the target item is determined. In some embodiments, where diverting mechanisms can be activated to perform a sorting action for a certain duration of time (e.g., diverting mechanisms such as air orifices that deflect a target item via airflows that can be continuously emitted for a given duration) and/or at a certain force (e.g., diverting mechanisms such as air orifices that deflect a target item via airflows for which the pressure of the airflows is adjustable), one or both of the duration and the force parameters can be selected based on another attribute of the target item. For example, the approximate geometry (e.g., the length of the target item) and/or the approximate mass of the target item can be used to determine one or both of the duration and the force parameters that are to be used to perform a sorting action on the target item.

At 1008, the controllable array sorting device is instructed to perform the sorting action on the target item using the selected subset of the diverting mechanisms using the determined at least one of the duration of time and the force.

Figure 11:
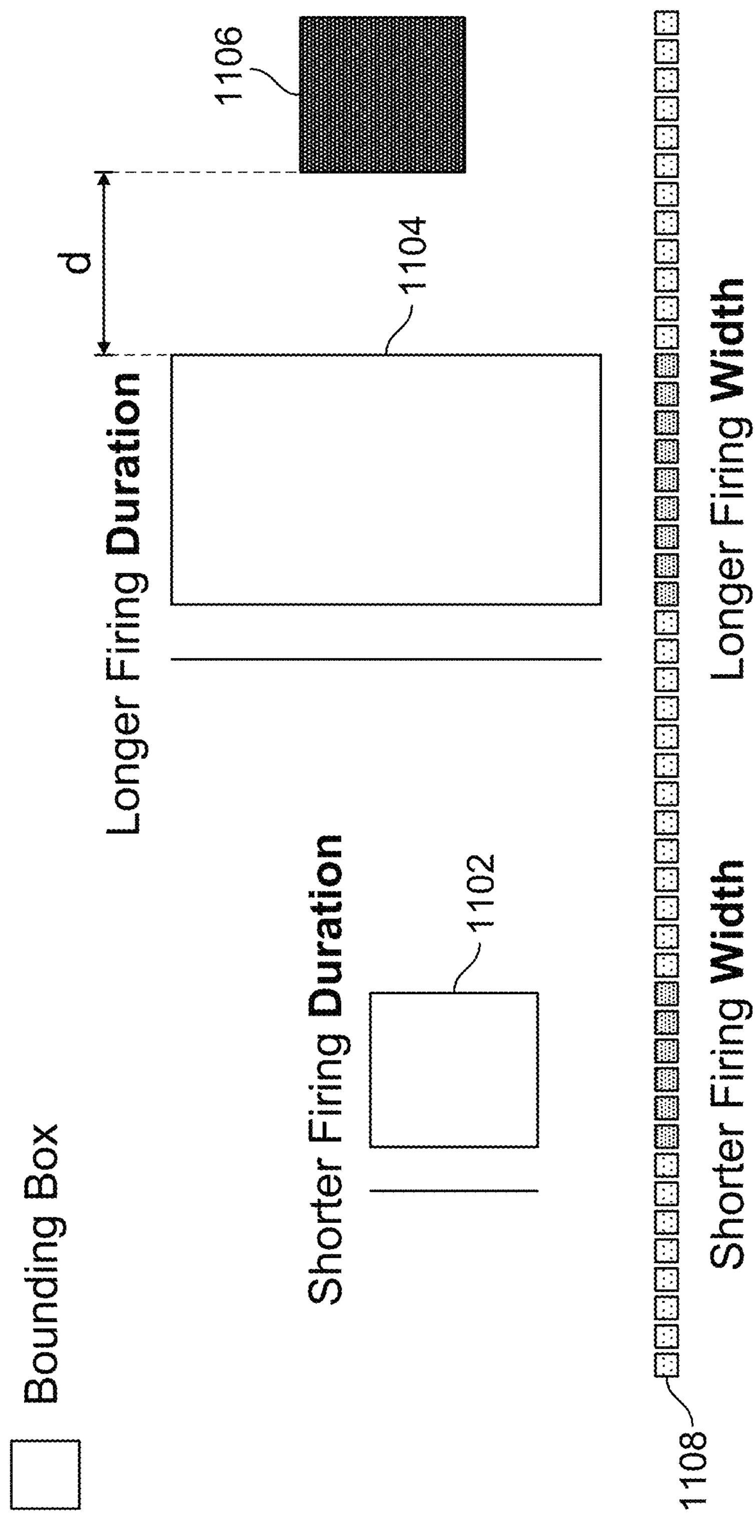
FIG. 11 is a diagram showing an example relationship between the polygon of a target item and the determined firing width as well as the firing duration of a controllable array sorting device.

FIG. 11 is a diagram showing an example relationship between the polygon of a target item and the determined firing width as well as the firing duration of a controllable array sorting device. In the example of FIG. 11, two target items corresponding to bounding box 1102 and bounding box 1104 are being transported by a conveyor device towards array of diverting mechanisms 1108. In the example of FIG. 11, the diverting mechanisms of array of diverting mechanisms 1108 are air orifices from which pressurized air is emitted when the diverting mechanisms are activated by the controllable array sorting device to perform a sorting action of deflecting a target item into a collection container. In the example of FIG. 11, the polygon of a target item is the bounding box of the target item. As such, the bounding boxes (bounding box 1102 and bounding box 1104) of two target items are shown in the example of FIG. 11. For simplicity, this concept is represented by rectangular boxes in the example of FIG. 11. However, the idea still of approximating the shape of an item still holds for more complex and/or precise contouring around the item that may provide a tighter bound to the two-dimensional and three-dimensional form of the item. For example, a minimum bounding box is determined for each target item as the smallest bounding box that encloses the entire target item. As mentioned above, an object recognition device that is located above a conveyor device that is transporting items to be sorted is configured to capture one or more perspectives of the image frames of the items as they are moving on the conveyor device. A sorting control device that receives the captured image frames then applies machine learning to the image frames to identify zero or more target items and zero or more non-target items within the image frames. In some embodiments, for each identified target item within the image frames, the sorting control device determines a corresponding bounding box around the target item. The bounding box of a target item will represent an approximate two-dimensional (e.g., length and width) or three-dimensional (e.g., length, width, and height) perspective of the target item. In some embodiments, the sorting control device will use the bounding box information of each target item, along with other information (e.g., other attribute information and the location information) of the target item to determine the "firing width" (i.e., the number and location of contiguous diverting mechanisms within an array of diverting mechanisms of the controllable array sorting device) and the "firing duration" (i.e., the duration of time for which the selected diverting mechanisms within the firing width will perform the sorting action such as shooting airflows at the target item) that should be applied to the target item after it falls off the conveyor device and is in proximity to the diverting mechanisms of the controllable array sorting device. In some embodiments, the firing width that is selected for a target item increases as the size of the bounding box of the target item increases. In some embodiments, the firing duration that is selected for a target item increases as the size of the bounding box of the target item increases. Referring to FIG. 11, because bounding box 1104 is larger than bounding box 1102, both a wider firing width and a longer firing duration will be applied to firing on the target item associated with bounding box 1104 than the target item associated with bounding box 1102. The firing width and firing duration for a target item are sent by the sorting control device to the controllable array sorting device via one or more control signals.

In some embodiments, other than the bounding box of a target item, the controllable array sorting device may use other factors to determine at least the firing width and firing duration associated with a selected subset of diverting mechanisms to use on the target item. Examples of these other factors may include the determined material type of the target item, the approximate mass of the target item, the (e.g., detected) speed of the conveyor device, and heuristics.

In various embodiments, performance of a sorting action on a target item may be suppressed depending on the neighboring non-target items relative to the target item. In some embodiments, non-target items and their respective corresponding bounding boxes are also determined by the sorting control device from the image frame(s) that it has captured. In some embodiments, the sorting control device determines the respective shortest distances between a bounding box of the target item and the bounding box of each one or more non-target items on the conveyor device. The sorting control device is then configured to determine which non-target items are neighboring non-target items relative to the target item based at least in part on the respective shortest distance between the bounding box of each non-target item and the bounding box of a target item. For example, a non-target item for which the shortest distance between its bounding box to that of the target item is less than a predetermined proximity threshold is considered to be a neighboring non-item relative to that target item. Then, attribute information of the target item is compared to attribute information of the same type corresponding to all neighboring non-target items relative to the target item. For example, the approximate mass of the target item is compared to the aggregated approximate masses of all neighboring non-target items relative to the target item. The ratio of the approximate mass of the target item to the aggregated approximate masses of all neighboring non-target items is then compared to a predetermined ratio threshold. For example, if the ratio is greater than the predetermined ratio threshold, then a sorting action is determined to be executed on the target item. Otherwise, if the ratio is equal to or less than the predetermined ratio threshold, then a sorting action on the target item is determined to be suppressed. Referring to FIG. 11, given that the distance d between bounding box 1104 of the target item and bounding box 1106 of the non-target item is less than a predetermined proximity threshold, the non-target item is determined to be a neighboring non-target item relative to the target item associated with bounding box 1104 in this example. Whether a sorting action on the target item associated with bounding box 1104 is to be suppressed may then be determined based, for example, on a ratio between the approximate mass of the target item relative to the at least approximate mass of the non-target item.

While FIG. 11 shows selecting the subset of diverting mechanisms of a controllable array sorting device with respect to a target item based on the determined bounding box of the target item, in some other embodiments, the subset of diverting mechanisms of the controllable array sorting device can be selected based on another form of geometry or other metric that is determined for the target item.

Figure 12:
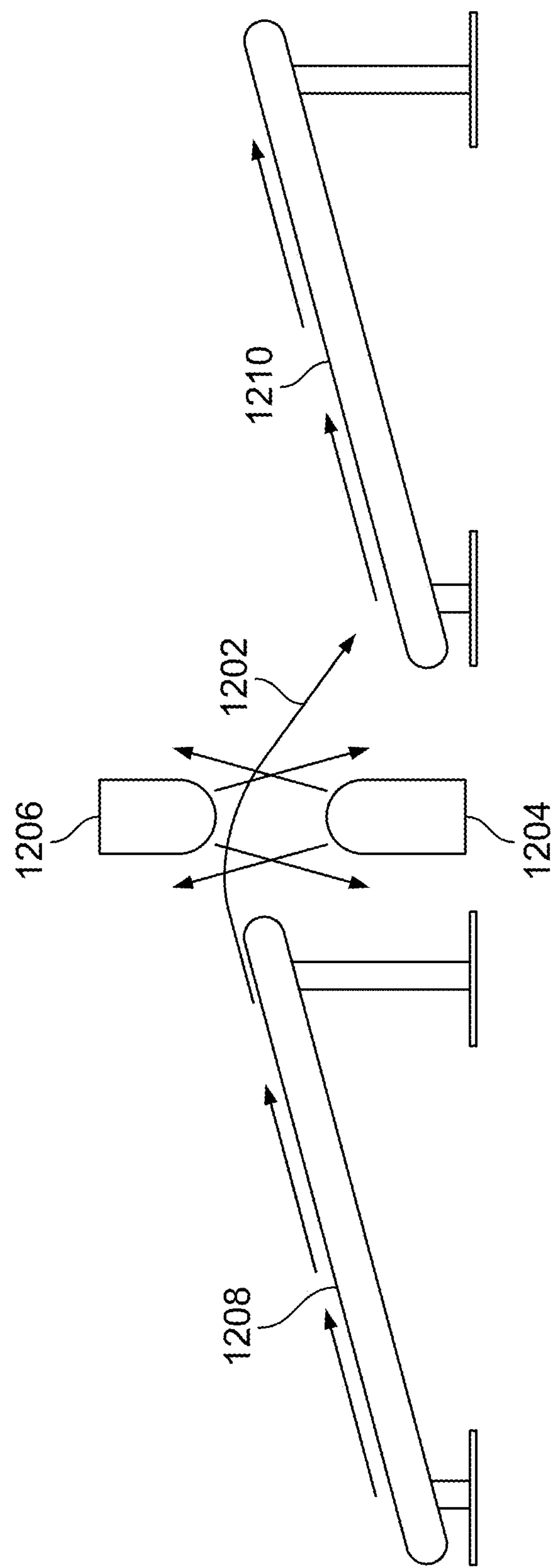
FIG. 12 is a diagram showing two example conveyor devices and a controllable array sorting device that is located at the junction between the two conveyor devices.

FIG. 12 is a diagram showing two example conveyor devices and a controllable array sorting device that is located at the junction between the two conveyor devices. Conveyor devices 1208 and 1210 are adjacent conveyor devices in a sorting line (e.g., in a material recovery facility, manufacturing process line, or otherwise). Items that are transported across conveyor device 1208 are propelled toward conveyor device 1210 with trajectory 1202 due to the high speed at which the conveyor belt of conveyor device 1208 moves. In this example, the controllable array sorting device uses multiple rows/arrays of air orifices connected to pressurized air sources as diverting mechanisms to shoot target items in various directions out of trajectory 1202 into corresponding collection mechanisms (not shown but could be target conveyors or containers). For example, diverting mechanisms 1206 of the controllable array sorting device are configured to shoot target items downwards into one or more collection mechanisms and diverting mechanisms 1204 of the controllable array sorting device are configured to shoot target items upwards into one or more collection mechanisms. For example, different types of target items may be shot out of trajectory 1202 into corresponding directions. That each of conveyor devices 1208 and 1210 is angled enables each to propel items farther than if each had been flat, thus providing more horizontal space at its junction with the next conveyor device for the controllable array sorting device to deflect target items out of the propelled stream of materials.

Figure 13:
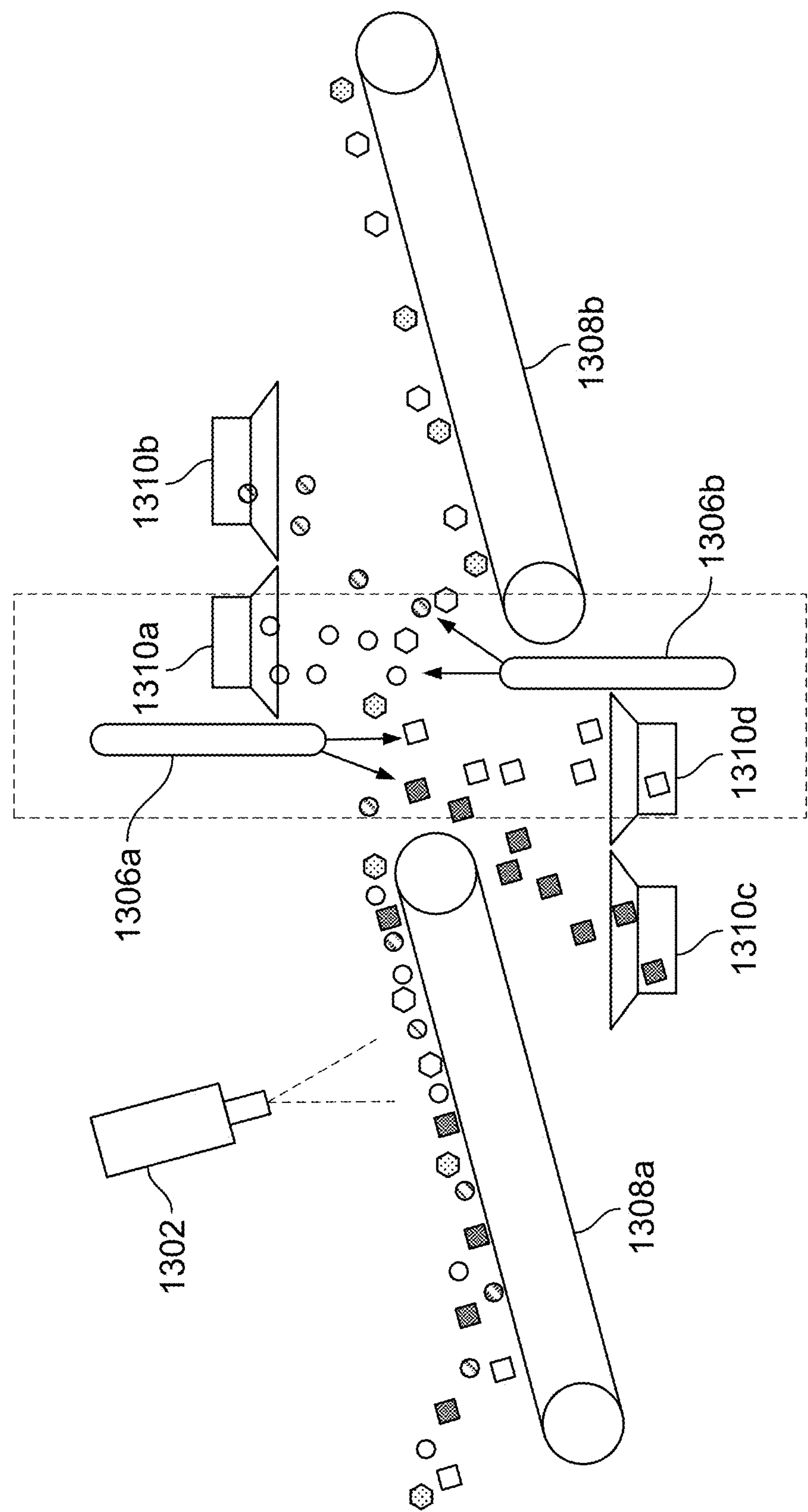
FIG. 13 is a diagram showing two example conveyor devices and two controllable array sorting devices that are located at the junction between the two conveyor devices.

FIG. 13 is a diagram showing two example conveyor devices and two controllable array sorting devices that are located at the junction between the two conveyor devices. In the example of FIG. 13, items are transported along conveyor device **1308*a* towards controllable array sorting devices 1306*a* and 1306*b*. As the items are traveling across conveyor device 1308*a*, object recognition device 1302 is configured to capture one or more image frames of the items and a corresponding sorting control device (not shown) is configured to identify target items and also (e.g., neighboring) non-target items relative to each target item. In some embodiments, the sorting control device is configured to determine whether the performance of a sorting action on a target item should be suppressed based on attribute information associated with the target item and the attribute information of that target item's neighboring non-target items. For the target items on which the sorting control device determines that respective sorting actions should not be suppressed, the sorting control device is configured to send corresponding control signals to controllable array sorting devices 1306*a* and 1306*b* to instruct the sorting devices to fire on the respective target items (e.g., using selected subsets of diverting mechanisms thereof). Controllable array sorting devices 1306*a* and 1306*b* are then configured to fire on the target items (for which fire is not suppressed) as the target items are in the air in between conveyor device 1308*a* and conveyor device 1308*b*. As shown in the example, controllable array sorting devices 1306*a* and 1306*b* are each configured to shoot in two directions, where each direction is associated with a particular material type or grouping of material types. The fired-on target items are then deflected into their respective collection containers 1310*a*, 1310*b*, 1310*c*, and 1310*d***, where each collection container is configured to store target items of a different type of material, for example.

Figure 14:
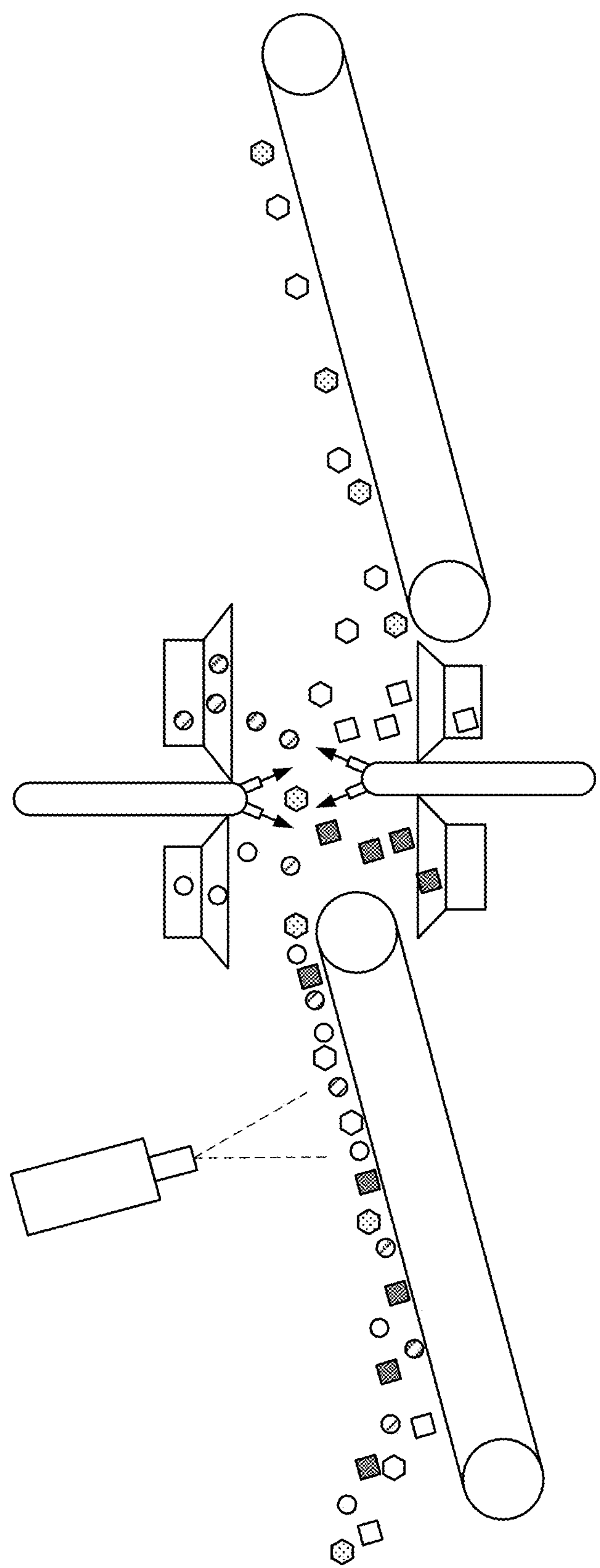
FIG. 14 is a diagram showing two example conveyor devices and two controllable array sorting devices that are located at the junction between the two conveyor devices.

FIG. 14 is a diagram showing two example conveyor devices and two controllable array sorting devices that are located at the junction between the two conveyor devices. The example of FIG. 14 is similar to the example of FIG. 13, only that the two controllable array sorting devices and collection containers are placed in different locations relative to each other at the junction/gap between the two conveyor devices.

Figure 15:
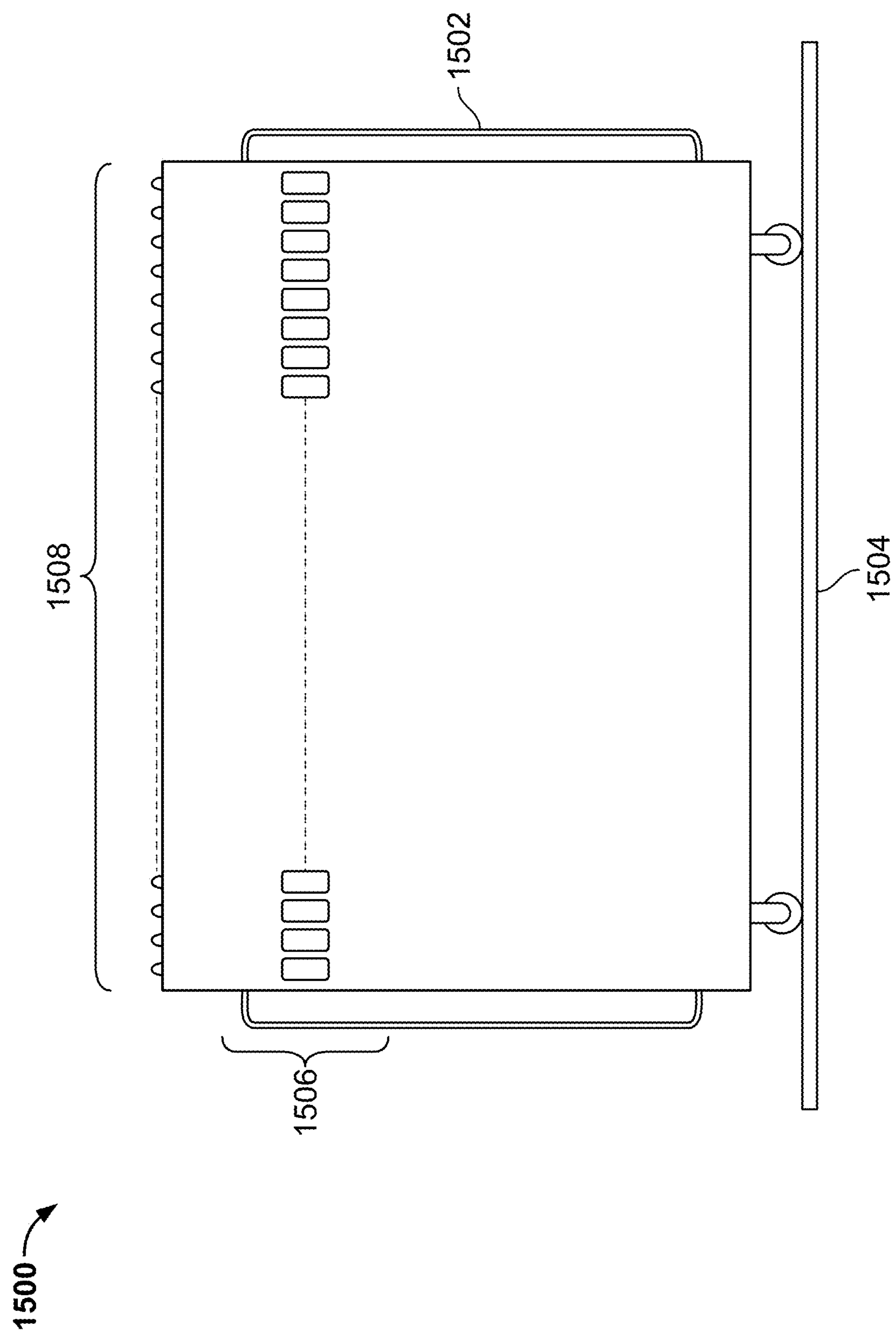
FIG. 15 is a diagram showing an example of a detachable controllable array sorting device.

FIG. 15 is a diagram showing an example of a detachable controllable array sorting device. In some embodiments, a controllable array sorting device is detachable in that it can easily be inserted into or removed from a sorting line (e.g., in a material recovery facility, manufacturing process line, or otherwise). In the example of FIG. 15, detachable sorting device 1500 comprises manifolds 1506 that hold sets of valves that will be attached via pneumatic tubes (not shown in FIG. 15) to array of diverting mechanisms 1508. In the example of FIG. 15, diverting mechanisms 1508 comprise air orifices that can be activated to emit airflows from pressurized air sources. Different sections of array of diverting mechanisms 1508 will shoot air at target items as they fall off a conveyor device, depending on where the target items were on the conveyor belt and the estimated dimensions (e.g., length and width) of the target items, to change the trajectory of the target items such that they fall onto a collection mechanism (e.g., a target conveyor or a collection container).

As shown in FIG. 15, sorting device 1500 is a specific example of a controllable array sorting device that can be detachable from a sorting line because sorting device 1500 is not physically attached to the other modular components (e.g., conveyor devices) of a sorting line. Instead, sorting device 1500 is configured to roll onto tracks 1504 that are attached to the floor of a material recovery facility. As such, sorting device 1500 can be easily taken out of a sorting line (e.g., for maintenance and repair) and then reinserted into the correct position within the sorting line by simply being rolled back onto tracks 1504, which ensures that the sorting device will always be placed in the same, designated location. Handles 1502 located on the side of sorting device 1500 make it easy for a user to pull and push the sorting device in and out of the sorting line.

Alternative to the detachable controllable array sorting device that can be rolled onto tracks that is shown in FIG. 15, in some embodiments, the controllable array sorting device can be removable from a sorting line but not attached to the ground. A specific example of a removable controllable array sorting device is one that can be attached, mounted, and/or fastened onto a conveyor device. For example, such a removable controllable array sorting device can be slid in and out of a designated location along the conveyor device. That way, the removable controllable array sorting device can still be unfastened from the conveyor device for repair or maintenance but can also be added back into the sorting line at a consistent position.

Any type of detachable controllable array sorting device such as the examples described herein would enable the use of interchangeable sorting devices, which would help prevent any down time in operation when a controllable array sorting device is to be repaired or maintained. Furthermore, in some embodiments, the controllable array sorting device may include one or more components that enable maintenance such as nozzle bar hinges.

Figure 16:
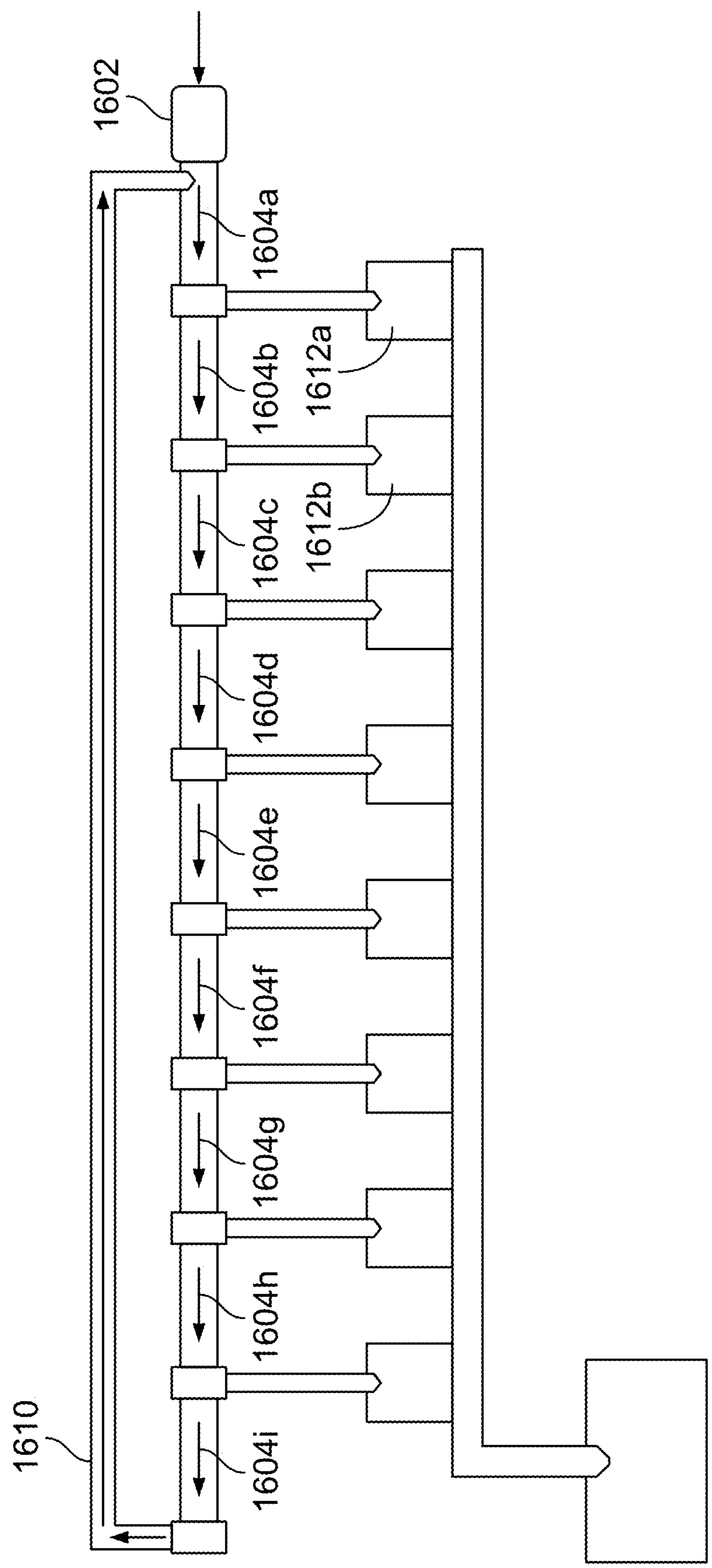
FIG. 16 is a diagram showing an embodiment of an efficient material recovery facility with a single sorting line.

FIG. 16 is a diagram showing an embodiment of an efficient material recovery facility with a single sorting line. Materials enter the sorting line at location 1602 and are serially processed by the series of nine conveyor devices (conveyor devices 1604*a*, 1604*b*, 1604*c*, 1604*d*, 1604*e*, 1604*f*, 1604*g*, 1604*h*, and 1604*i*) and interleaved controllable array sorting devices. Each of the controllable array sorting devices may be implemented using controllable array sorting device 100 of FIG. 1. While not shown in the example sorting line of FIG. 16, each of conveyor devices 1604*a*, 1604*b*, 1604*c*, 1604*d*, 1604*e*, 1604*f*, 1604*g*, 1604*h*, and 1604*i* can be angled at substantially the same angle relative to the plane (e.g., floor) on which the conveyor devices are placed. The target items that are fired on by each of the controllable array sorting devices that follow a corresponding conveyor device are deflected upwards, downwards, or laterally as they fall from one conveyor device and onto a target conveyor that ultimately transports the target items away from the sorting line and into a corresponding collection container (such as collection containers 1612*a* and 1612*b*) that stores recovered material (e.g., of a particular material type). The last controllable array sorting device in the sorting line is configured to select items of any material type that is selected by any of the preceding sorting devices and cause those selected items to be deposited onto recirculation conveyor 1610 so that they can be transported back to the front of the sorting line and recirculate through the sorting line, starting from the first conveyor device, conveyor device 1604*a*. Those items that are not selected by the last sorting device in the sorting line are deposited into a residue disposal container (not shown).

A sorting device that includes a controllable array of diverting mechanisms is described herein. The array of diverting mechanisms can be controlled to fire selective subsets of diverting mechanisms and for selective durations of time to deflect target items into collection mechanisms. Various embodiments of a controllable array sorting device can be modularly added to sorting lines of a material recovery facility to provide efficient and focused sorting of certain materials and types of items.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A controllable array sorting device, comprising:
an array of diverting mechanisms; and
a processor coupled to the array of diverting mechanisms, wherein the processor is configured to:
process an instruction to perform a sorting action on a target item, wherein the instruction specifies a selected subset of the array of diverting mechanisms to use to perform the sorting action, wherein the selected subset of the array of diverting mechanisms comprises a specified width of diverting mechanisms in a specified section within the array of diverting mechanisms,
wherein the specified width of diverting mechanisms and the specified section within the array of diverting mechanisms are determined based at least in part on a location of the target item on a conveyor device and an attribute of the target item; and
in response to the instruction, cause the selected subset of the array of diverting mechanisms to perform the sorting action on the target item.

2. The controllable array sorting device of claim 1, wherein the array of diverting mechanisms comprises a first array of diverting mechanisms, and wherein the controllable array sorting device comprises a plurality of arrays of diverting mechanisms including the first array of diverting mechanisms, wherein each array of diverting mechanisms is configured to deflect items into a different direction.

3. The controllable array sorting device of claim 2, wherein the instruction further specifies to use the first array of diverting mechanisms to perform the sorting action.

4. The controllable array sorting device of claim 1, wherein the instruction further specifies a duration of time for which to perform the sorting action on the target item and wherein the processor is further configured to cause the selected subset of the array of diverting mechanisms to perform the sorting action on the target item for the duration of time.

5. The controllable array sorting device of claim 1, wherein the instruction further specifies a first instruction to start performing the sorting action and a second instruction to stop performing the sorting action on the target item and wherein the processor is further configured to cause the selected subset of the array of diverting mechanisms to perform the sorting action on the target item in accordance with the first instruction and the second instruction.

6. The controllable array sorting device of claim 1, wherein the instruction further specifies a first instruction and a second instruction, wherein each of the first instruction and the second instruction causes the selected subset of the array of diverting mechanisms to activate in association with performing the sorting action on the target item and wherein the processor is further configured to cause the selected subset of the array of diverting mechanisms to perform the sorting action on the target item in accordance with the first instruction and the second instruction.

7. The controllable array sorting device of claim 1, wherein the instruction further specifies a degree of force with which to perform the sorting action on the target item and wherein the processor is further configured to cause the selected subset of the array of diverting mechanisms to perform the sorting action on the target item using the degree of force.

8. The controllable array sorting device of claim 1, wherein the array of diverting mechanisms comprises an array of air orifices that are coupled to one or more pressurized air sources.

9. The controllable array sorting device of claim 1, wherein the array of diverting mechanisms comprises an array of mechanical paddles that are coupled to an actuation mechanism.

10. The controllable array sorting device of claim 1, wherein the instruction was determined to be sent to the controllable array sorting device based at least in part on a set of neighboring non-target items relative to the target item on the conveyor device.

11. The controllable array sorting device of claim 10, wherein the set of neighboring non-target items relative to the target item on the conveyor device was determined, including:

wherein a respective distance between a polygon of the target item and a respective polygon of each of a set of non-target items was determined; and wherein a subset of the set of non-target items that is associated with the respective distances relative to the polygon of the target item that are less than a predetermined proximity threshold or a dynamically determined and configured proximity threshold is determined as the set of neighboring non-target items relative to the target item.

12. The controllable array sorting device of claim 10, wherein the instruction was determined to be sent to the controllable array sorting device based at least in part on a comparison of attribute information associated with the target item and attribute information associated with the set of neighboring non-target items relative to the target item.

13. The controllable array sorting device of claim 1, wherein the specified width of diverting mechanisms and the specified section within the array of diverting mechanisms are further determined based at least in part on a collection container corresponding to the target item.

14. The controllable array sorting device of claim 1, wherein to cause the selected subset of the array of diverting mechanisms to perform the sorting action on the target item comprises to cause the selected subset of the array of diverting mechanisms to perform the sorting action on the target item after the target item falls between conveyor devices.

15. The controllable array sorting device of claim 1, wherein the controllable array sorting device is operable to be inserted and detached from a sorting line at a designated location.

16. The controllable array sorting device of claim 1, wherein the instruction was determined based at least in part on using one or more of neural networks and artificial intelligence on sensed data associated with the target item.

17. A method, comprising:

processing an instruction to perform a sorting action on a target item, wherein the instruction specifies a selected subset of an array of diverting mechanisms of a controllable array sorting device to use to perform the sorting action, wherein the selected subset of the array of diverting mechanisms comprises a specified width of diverting mechanisms in a specified section within the array of diverting mechanisms, wherein the specified width of diverting mechanisms and the specified section within the array of diverting mechanisms are determined based at least in part on a location of the target item on a conveyor device and an attribute of the target item; and in response to the instruction, causing the selected subset of the array of diverting mechanisms to perform the sorting action on the target item.

18. The method of claim 17, wherein the specified width of diverting mechanisms and the specified section within the array of diverting mechanisms are further determined based at least in part on location information associated with the target item and a collection container corresponding to the target item.

19. The method of claim 17, wherein the instruction was determined to be sent to the controllable array sorting device based at least in part on a set of neighboring non-target items relative to the target item on the conveyor device.

20. The method of claim 19, wherein the instruction was determined to be sent to the controllable array sorting device based at least in part on a comparison of attribute information associated with the target item and attribute information associated with the set of neighboring non-target items relative to the target item.

* * * * *